United States Patent
Tanaka et al.

(10) Patent No.: US 6,438,004 B1
(45) Date of Patent: Aug. 20, 2002

(54) POWER CONVERSION APPARATUS UTILIZING SOFT SWITCHING RESONANT SNUBBER CIRCUITRY

(75) Inventors: Katsuaki Tanaka; Yoshihisa Okita; Kazuyuki Itoh, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/033,412

(22) Filed: Dec. 26, 2001

Related U.S. Application Data

(63) Continuation of application No. PCT/JP01/03663, filed on Apr. 26, 2001.

(30) Foreign Application Priority Data

Apr. 28, 2000 (JP) ........................................ 2000-130513
Aug. 11, 2000 (JP) ........................................ 2000-243563

(51) Int. Cl.$^7$ ............................ H02H 7/122; H02M 7/68
(52) U.S. Cl. ............................... 363/56.02; 363/56.04; 363/98; 363/132
(58) Field of Search .......................... 363/56.02, 56.03, 363/56.04, 56.05, 95, 98, 131, 132

(56) References Cited

U.S. PATENT DOCUMENTS

| | | | |
|---|---|---|---|
| 4,730,242 A | * 3/1988 | Divan | 363/37 |
| 5,047,913 A | 9/1991 | De Doncker et al. | |
| 5,642,273 A | * 6/1997 | Lai et al. | 363/56 |
| 5,684,688 A | * 11/1997 | Rouand et al. | 363/132 |
| 5,710,698 A | * 1/1998 | Lai et al. | 363/56 |
| 6,069,809 A | * 5/2000 | Inoshita | 363/98 |
| 6,219,265 B1 | * 4/2001 | Bernet | 363/137 |

FOREIGN PATENT DOCUMENTS

| | | |
|---|---|---|
| JP | 7-115775 | 5/1995 |
| JP | 7-337022 A | 12/1995 |
| JP | 8-149854 A | 6/1996 |
| JP | 9-308229 | 11/1997 |

* cited by examiner

*Primary Examiner*—Bao Q. Vu
(74) *Attorney, Agent, or Firm*—Cohen, Pontani, Lieberman & Pavane

(57) ABSTRACT

The present invention discloses a power conversion apparatus comprising a control circuit for generating a switching signal at the timing allowing soft-switching to be achieved, and free from any occurrence of ripple.

The power conversion apparatus includes a first main switch (Q1) and a second main switch (Q2) which are connected in series with each other. One of the ends of the first main switch is connected with the positive side of a DC power supply, and one of the ends of the second main switch is connected to the negative side of the DC power supply. A diode (D1, D2) is connected in parallel with each of the main switches so as to become reverse biased with respect to the DC power supply. A main-switch snubber capacitor (C1, C2) is connected in parallel with each of the main switches. A load is connected with the junction between the pair of main switches, and the main switches are controllably switched according a switching signal from a control circuit to generate an output. A first auxiliary resonant circuit including serial-connected first and second auxiliary switches (Q3, Q4, Q5, Q6) and a resonant inductor (L1) connected in series with the second auxiliary switch is connected with each of the positive side of the DC power supply and the junction between the two main switches. A diode is connected to each of the first and second auxiliary switches so as to become reverse biased with respect to the DC power supply. The control circuit provides a turn-on signal to the first and second auxiliary switches according to a voltage signal as an input representing the voltage across each of the main switches and auxiliary switches from voltage detecting means before a turn-on signal as the switching signal is provided to the first main switch.

26 Claims, 15 Drawing Sheets

POWER CONVERSION APPARATUS UTILIZING SOFT SWITCHING RESONANT SNUBBER CIRCUITRY

This application is a Continuation of International Application PCT/JP01/03663 filed Apr. 26, 2001.

TECHNICAL FIELD

The present invention generally relates to a power conversion apparatus. More specifically, the present invention relates to a power conversion apparatus having a control circuit capable of achieving soft-switching of a switching element.

BACKGROUND ART

In a power conversion apparatus such as a converter or an inverter, various circuits having a soft-switching function are currently under development in order to reduce a switching loss in each switching element and increase a switching frequency.

For example, U.S. Pat. No. 5,047,913 discloses a converter in which the voltage of a DC (Direct Current) power supply is split into two one-half voltages, by a pair of series-connected capacitors, and the junction between the capacitors is connected to the junction between a pair of series-connected main switches, through a circuit including a series connection of a bidirectional switch and an inductor. A load is connected to the junction between the main switches. A diode is connected in parallel with each of the main switches to allow each of the diodes to become reverse biased with respect to the DC power supply. A snubber capacitor is connected in parallel with each of the main switches. In the power conversion apparatus described in this US Patent, it is intended to obtain a specific condition for achieving soft-switching of all switches by making up an auxiliary resonant commutation circuit with the circuit of the bidirectional switch and the inductor makes up and performing resonant operation through the auxiliary resonant commutation circuit.

In the above circuit, while such soft-switching is achieved when each of the main switches are turned on, a turn-off loss is caused by turning off each of the main switches. Specifically, in this circuit, for commutating from one of the main switches to the other main switch, the bidirectional switch is first turned on in the state when a load current is refluxed to the diode connected in parallel with the one main switch, so as to generate a resonant state. Then, when the current of the inductor increases up to a sufficient extent for commutation, the above one main switch is turned off. However, the control taught in this US Patent is inevitably involved with turn-off loss of the main switches. The necessity for detecting of a resonant current required for commutation also forces a complicated control.

Furthermore, in this prior art circuit, for preventing the accumulated energy in the snubber capacitor connected to each of the main switches from being consumed as short-circuit loss in the main switches under light load, the auxiliary switch is turned on before switching the main switches to commutate from one of the main switches to the other main switch. In this control, upon turning on the auxiliary switch, the inductor current starts passing through the one main switch along with the load current. When the current goes up to a certain threshold, the one main switch is turned off to charge or discharge the energy in each of the snubber capacitors. After the completion of commutation, the other main switch is turned on. Thus, a turn-on at zero current is achieved in the other main switch, and the energy of the snubber capacitor does not become a loss. However, the control taught in this US Patent is undesirably involved with complexity in control due to the switching control according to detecting the inductor current required for commutation.

Moreover, in the control taught by the US Patent, for commutating with passing the load current through the diode connected in parallel to the other main switch in the state when the load current passes through the other main switch, the commutation in large load current is achieved based on the load current without activating the auxiliary resonant commutation circuit. In small load current, the commutation is achieved based on the sum of the resonant current and the load current with activating the auxiliary resonant commutation circuit. This control process undesirably involves a ripple voltage caused by operating the power conversion apparatus as an inverter. Specifically, when the power conversion apparatus is operated as an inverter according to this control process, the current of the auxiliary resonant commutation circuit generates a ripple having the same cycle as that of the output voltage of the inverter at the midpoint of the potential of the capacitor connected in series with the DC power supply. If it is attempted to suppress this ripple voltage within the allowable range of voltage variation, it will be required to employ capacitors having larger capacity than those of conventional circuits, resulting in larger size components.

Japan Patent Laid-Open Publication No. Hei 07-115775 discloses an inverter in which one ends of auxiliary switches is connected respectively to a first split point having a first potential and a second split point having a second potential, the other ends of the auxiliary switches being connected with each other, and the junction between the auxiliary switches being connected with the junction between a pair of main switches through a resonant inductor. A snubber capacitor is connected in parallel with each of the main switches. A diode is connected in parallel with each of the main switches and in the reverse bias direction with respect to a DC power supply. In the circuit for a power conversion apparatus disclosed in this Patent Laid-Open Publication, an auxiliary resonant commutation circuit is formed of the auxiliary switches, the resonant inductor, and the snubber capacitors each connected in parallel with the main switches so as to achieve soft-switching based on resonant current passing through the formed resonant circuit.

The power conversion apparatus described in this Patent Laid-Open Publication employs a battery to obtain the first and second potentials. This undesirably makes the circuit larger in size. If a capacitor is used to provide smaller size apparatus, a ripple voltage having the same cycle as that of the output voltage of the inverter will be generated between the first and second potentials. This causes the same problem as that of the circuit described in the above US Patent occurs.

DISCLOSURE OF THE INVENTION

In view of the aforementioned problem in conventional power conversion apparatuses intended for achieving soft-switching, it is therefore a primary object of the present invention to provide an improved power conversion apparatus comprising a control circuit for generating a switching signal at the timing allowing soft-switching to be achieved, and free from any occurrence of ripple.

In order to achieve this object, a power conversion apparatus according to the present invention includes at least a pair of main switches composed of serial-connected first and second main switches, wherein one of the ends of the first main switch is connected with the positive side of a DC power supply, and one of the ends of the second main switch is connected to the negative side of the DC power supply. The power conversion apparatus further includes a diode connected in parallel with each of the main switches so as to become reverse biased with respect to the DC power supply, a main-switch snubber capacitor connected in parallel with each of the main switches, a load connected with the junction between the pair of main switches, and a control circuit for forming a switching signal for controlling the switching operation of the main switches by using a load voltage and/or a load current as an input thereof, wherein the main switches are controllably switched according to the switching signal from the control circuit so as to generate an output. Based on the above construction, the power conversion apparatus of the present invention comprises a first auxiliary resonant circuit including serial-connected first and second auxiliary switches and a resonant inductor connected in series with the second auxiliary switch, wherein the first auxiliary resonant circuit is connected with each of the positive side of the DC power supply and the junction between the pair of main switches. The power conversion apparatus further includes a diode connected to each of the first and second auxiliary switches so as to become reverse biased with respect to the DC power supply, and voltage detecting means for detecting the voltage across each of the main switches and auxiliary switches. The control circuit is applied with a voltage signal as an input representing the voltage across each of the main switches and auxiliary switches from the voltage detecting means, and then the control circuit provides a turn-on signal to the first and second auxiliary switches according to the input before a turn-on signal as the switching signal is provided to the first main switch. The control circuit also provides the turn-on signal to the first and second auxiliary switches when the load current passes through the diode connected in parallel with the second main switch, so as to turn on the first and second auxiliary switches to direct the current from the DC power supply to the resonant inductor. Then, a resonant circuit is formed by the resonant inductor and the snubber capacitors connected in parallel with the main switches when the current of the resonant inductor goes up approximately to the load current, and the control circuit outputs a signal for turning on the first main switch when the voltage across the first main switch goes down approximately to zero through the resonance in the resonance circuit.

In another aspect of the present invention, the power conversion apparatus may includes serial-connected third and fourth auxiliary switches which are connected between the negative side of the DC power supply and the inductor so as to form a second auxiliary resonant circuit. Further, an auxiliary-switch snubber capacitor is connected between the junction between the first and second auxiliary switches and the junction between the third and fourth auxiliary switches, and a diode is connected to each of the third and fourth auxiliary switches so as to become reverse biased with respect to the DC power supply. In this case, the control circuit provides a turn-off signal to the first auxiliary switch when the charged voltage of the auxiliary-switch snubber capacitor is approximately equal to the voltage of the DC power supply after the first main switch is turned on, and to provide the turn-off signal to the second auxiliary switch when the charged voltage of the auxiliary-switch snubber capacitor is approximately equal to zero after the first main switch is turned on, so as to achieve soft-switching of the first and second auxiliary switches.

In another aspect of the present invention, the power conversion apparatus comprises a second auxiliary resonant circuit including serial-connected third and fourth auxiliary switches and a resonant inductor connected in series with the fourth auxiliary switch, wherein the second auxiliary resonant circuit is connected with each of the negative side of the DC power supply and the junction between the pair of main switches. The power conversion apparatus further includes a diode connected to each of the third and fourth auxiliary switches so as to become reverse biased with respect to the DC power supply, and voltage detecting means for detecting the voltage across each of the main switches and auxiliary switches. In this case, the control circuit is applied with a voltage signal as an input representing the voltage across each of the main switches and auxiliary switches from the voltage detecting means. The control circuit provides a turn-on signal to the third and fourth auxiliary switches according to the input, before a turn-on signal as the switching signal is provided to the second main switch, when the first main switch is in ON-state to allow the load current to pass through the first main switch and the load current is less than a threshold associated with the product of multiplying the capacity of the main-switch snubber capacitor by the power supply voltage of the DC power supply, so as to turn on the third and fourth auxiliary switches to direct the current from the DC power supply to the resonant inductor. Further, the control circuit provides a turn-off signal to the first main switch when the current of the resonant inductor goes up approximately to the threshold, so as to turn off the first main switch. The control circuit may be adapted to provide the turn-on signal to the second main switch, when the third and fourth auxiliary switches are in ON-state and the current passing through the resonant inductor is refluxed from the third and fourth auxiliary switches through the diode connected in parallel with the second main switch.

The control circuit according another aspect of the present invention may be adapted to provide the turn-off signal to the third auxiliary switch after the second main switch is turned on, when the initial voltage of the auxiliary-switch snubber capacitor is approximately equal to the voltage of the DC power supply, and to provide the turn-off signal to the fourth auxiliary switch after the second main switch is turned on, when the initial voltage of the auxiliary-switch snubber capacitor is approximately equal to zero, so as to achieve soft-switching of the third and fourth auxiliary switches. The control circuit may also be adapted to provide the turn-off signal to the first main switch without providing any turn-on signal to the third and fourth auxiliary switches, when the load current is larger than the threshold, so as to achieve soft-switching of the first main switch. The aforementioned threshold may be defined by the following formula;

$$I_{th} = Cr \times V_{in} / t_{max}$$

where $I_{th}$ is the threshold, Cr being the capacity of the main-switch snubber capacitor connected in parallel with the main switch, $V_{in}$ being the voltage of the DC power supply, and $t_{max}$ being the maximum allowable value of the time required for the load current to commutate from one of the first and second main switches to the other main switch.

The control circuit according to another aspect of the present invention provides a turn-on signal to the third and fourth auxiliary switches according to a voltage signal as an input representing the voltage across each of the main switches and the auxiliary switches from the voltage detecting means, before a turn-on signal as the switching signal is provided to the second main switch, and the control circuit also provides the turn-on signal to the third and fourth auxiliary switches when the load current passes through the diode connected in parallel with the first main switch, so as to turn on the third and fourth auxiliary switches to direct the current from the DC power supply to the resonant inductor. Then, a resonant circuit is formed by the resonant inductor and the snubber capacitors connected in parallel with the main switches when the current of the resonant inductor goes up approximately to the load current, and the control circuit outputs a signal for turning on the second main switch when the voltage across the second main switch goes down approximately to zero through the resonance in the resonance circuit.

According to another aspect of the present invention, the control circuit may be adapted to provide a turn-off signal to the third auxiliary switch when the charged voltage of the auxiliary-switch snubber capacitor is approximately equal to the voltage of the DC power supply after the second main switch is turned on, and to provide the turn-off signal to the fourth auxiliary switch when the charged voltage of the auxiliary-switch snubber capacitor is approximately equal to zero after the second main switch is turned on, so as to achieve soft-switching of the third and fourth auxiliary switches. In this case, the control circuit may also be adapted to provide a turn-on signal to the first and second auxiliary switches, before a turn-on signal as the switching signal is provided to the first main switch, when the second main switch is in ON-state to allow the load current to pass through the second main switch and the load current is less than a threshold associated with the product of multiplying the capacity of the main-switch snubber capacitor by the power supply voltage of the DC power supply, so as to turn on the first and second auxiliary switches to direct the current from the DC power supply to the resonant inductor, and then to provide a turn-off signal to the second main switch when the current of the resonant inductor goes up approximately to the threshold, so as to turn off the second main switch. Further, the control circuit may be adapted to provide the turn-on signal to the first main switch, when the first and second auxiliary switches are in ON-state and the current passing through the resonant inductor is refluxed from the first and second auxiliary switches through the diode connected in parallel with the first main switch.

In another aspect, a power conversion apparatus according to the present invention comprises a second auxiliary resonant circuit including serial-connected third and fourth auxiliary switches and a resonant inductor connected in series with the fourth auxiliary switch, wherein the second auxiliary resonant circuit is connected with each of the negative side of the DC power supply and the junction between the pair of main switches. The power conversion apparatus further includes a diode connected to each of the third and fourth auxiliary switches so as to become reverse biased with respect to the DC power supply, and voltage detecting means for detecting the voltage across each of the main switches and auxiliary switches. In this case, the control circuit is applied with a voltage signal as an input representing the voltage across each of the main switches and auxiliary switches from the voltage detecting means, and the control circuit provides a turn-on signal to the third and fourth auxiliary switches according to the input before a turn-on signal as the switching signal is provided to the second main switch. The control circuit also provides the turn-on signal to the third and fourth auxiliary switches when the load current passes through the diode connected in parallel with the second main switch, so as to turn on the third and fourth auxiliary switches to direct the current from the DC power supply to the resonant inductor. Then, a resonant circuit is formed by the resonant inductor and the snubber capacitors connected in parallel with the main switches when the current of the resonant inductor goes up approximately to the load current, and the control circuit outputs a signal for turning on the second main switch when the voltage across the second main switch goes down approximately to zero through the resonance in the resonance circuit.

In another aspect of the present invention, the power conversion apparatus may further includes serial-connected first and second auxiliary switches which are connected between the negative side of the DC power supply and the inductor so as to form a first auxiliary resonant circuit, an auxiliary-switch snubber capacitor connected between the junction between the first and second auxiliary switches and the junction between the third and fourth auxiliary switches, and a diode connected to each of the first and second auxiliary switches so as to become reverse biased with respect to the DC power supply. In this case, the control circuit provides a turn-off signal to the third auxiliary switch when the charged voltage of the auxiliary-switch snubber capacitor is approximately equal to the voltage of the DC power supply after the second main switch is turned on, and to provide the turn-off signal to the fourth auxiliary switch when the charged voltage of the auxiliary-switch snubber capacitor is approximately equal to zero after the second main switch is turned on, so as to achieve soft-switching of the third and fourth auxiliary switches.

In another aspect of the present invention, a power conversion apparatus comprises a first auxiliary resonant circuit including serial-connected first and second auxiliary switches and a resonant inductor connected in series with the second auxiliary switch, wherein the first auxiliary resonant circuit is connected with each of the positive side of the DC power supply and the junction between the pair of main switches. The power conversion apparatus further includes a diode connected to each of the first and second auxiliary switches so as to become reverse biased with respect to the DC power supply, and voltage detecting means for detecting the voltage across each of the main switches and auxiliary switches. In this case, the control circuit is applied with a voltage signal as an input representing the voltage across each of the main switches and auxiliary switches from the voltage detecting means, and the control circuit then provides a turn-on signal to the first and second auxiliary switches according to the input, before a turn-on signal as the switching signal is provided to the first main switch, when the second main switch is in ON-state to allow the load current to pass through the second main switch and the load current is less than a threshold associated with the product of multiplying the capacity of the main-switch snubber capacitor by the power supply voltage of the DC power supply, so as to turn on the first and second auxiliary switches to direct the current from the DC power supply to the resonant inductor. Further, the control circuit provides a turn-off signal to the second main switch when the current of the resonant inductor goes up approximately to the threshold, so as to turn off the second main switch. The control circuit may be adapted to provide the turn-on signal to the first main switch, when the first and second auxiliary switches are in ON-state and the current passing through the resonant inductor is refluxed from the first and second auxiliary switches through the diode connected in parallel with the first main switch.

According to another aspect of the present invention, the control circuit may be adapted to provide the turn-off signal to the first auxiliary switch after the first main switch is turned on, when the initial voltage of the auxiliary-switch snubber capacitor is approximately equal to the voltage of the DC power supply, and to provide the turn-off signal to the second auxiliary switch after the first main switch is turned on, when the initial voltage of the auxiliary-switch snubber capacitor is approximately equal to zero, so as to achieve soft-switching of the first and second auxiliary switches. The control circuit can also achieve soft-switching in the second main switch by providing the turn-off signal to the second main switch without providing any turn-on signal to the first and second auxiliary switches, when the load current is larger than a threshold. The threshold in this case may be defined by the same formula as described above.

According to another aspect of the present invention, the control circuit is applied with a voltage signal as an input representing the voltage across each of the main switches and auxiliary switches from the voltage detecting means. Then, the control circuit provides a turn-on signal to the first and second auxiliary switches according to the input before a turn-on signal as the switching signal is provided to the first main switch, and provides the turn-on signal to the first and second auxiliary switches when the load current passes through the diode connected in parallel with the second main switch, so as to turn on the first and second auxiliary switches to direct the current from the DC power supply to the resonant inductor. Then, the control circuit outputs a signal for turning on the first main switch when the voltage across the first main switch goes down approximately to zero through the resonance in a resonance circuit formed by the resonant inductor and the snubber capacitors connected in parallel with the main switches when the current of the resonant inductor goes up approximately to the load current.

According another aspect of the present invention, the control circuit may be adapted to provide a turn-off signal to the first auxiliary switch when the charged voltage of the auxiliary-switch snubber capacitor is approximately equal to the voltage of the DC power supply after the first main switch is turned on, and to provide the turn-off signal to the second auxiliary switch when the charged voltage of the auxiliary-switch snubber capacitor is approximately equal to zero after the second main switch is turned on, so as to achieve soft-switching of the first and second auxiliary switches. In this case, the control circuit may also be adapted to provide a turn-on signal to the third and fourth auxiliary switches, before a turn-on signal as the switching signal is provided to the second main switch, when the first main switch is in ON-state to allow the load current to pass through the first main switch and the load current is less than a threshold associated with the product of multiplying the capacity of the main-switch snubber capacitor by the power supply voltage of the DC power supply, so as to turn on the third and fourth auxiliary switches to direct the current from the DC power supply to the resonant inductor, and then to provide a turn-off signal to the first main switch when the current of the resonant inductor goes up approximately to the threshold, so as to turn off the first main switch. Further, the control circuit may be adapted to provide the turn-on signal to the second main switch, when the third and fourth auxiliary switches are in ON-state and the current passing through the resonant inductor is refluxed from the third and fourth auxiliary switches through the diode connected in parallel with the second main switch.

In another aspect of the present invention, the control circuit provides a turn-on signal to the third and fourth auxiliary switches and provide a turn-off signal to the first main switch, before a turn-on signal as the switching signal is provided to the second main switch, when the first main switch is in ON-state to allow the load current to pass through the first main switch and the load current is less than a threshold associated with the product of multiplying the capacity of the main-switch snubber capacitor by the power supply voltage of the DC power supply, so as to turn on the third and fourth auxiliary switches to generate a resonance between the resonant inductor and the snubber capacitor, to achieve the commutation between the main switches. Similarly, in light load, the control circuit provides a turn-on signal to the third and fourth auxiliary switches and provide a turn-off signal to the second main switch, before a turn-on signal as the switching signal is provided to the first main switch, when the second main switch is in ON-state to allow the load current to pass through the second main switch and the load current passes through the second main switch the control circuit provides a turn-on signal to the third and fourth auxiliary switches and provide a turn-off signal to the first main switch, before a turn-on signal as the switching signal is provided to the second main switch, when the first main switch is in ON-state to allow the load current to pass through the first main switch and the load current is less than a threshold associated with the product of multiplying the capacity of the main-switch snubber capacitor by the power supply voltage of the DC power supply, so as to turn on the third and fourth auxiliary switches to generate a resonance between the resonant inductor and the snubber capacitor, to achieve the commutation between the main switches.

The control according to the above aspect can advantageously eliminate the need for detecting current and thereby facilitate simplifying the control. Further, since no indicator current is passed through the main switches, the turn-off loss in the mains switches is not increased.

BEST MODE FOR CARRYING OUT THE INVENTION

Figure 1:
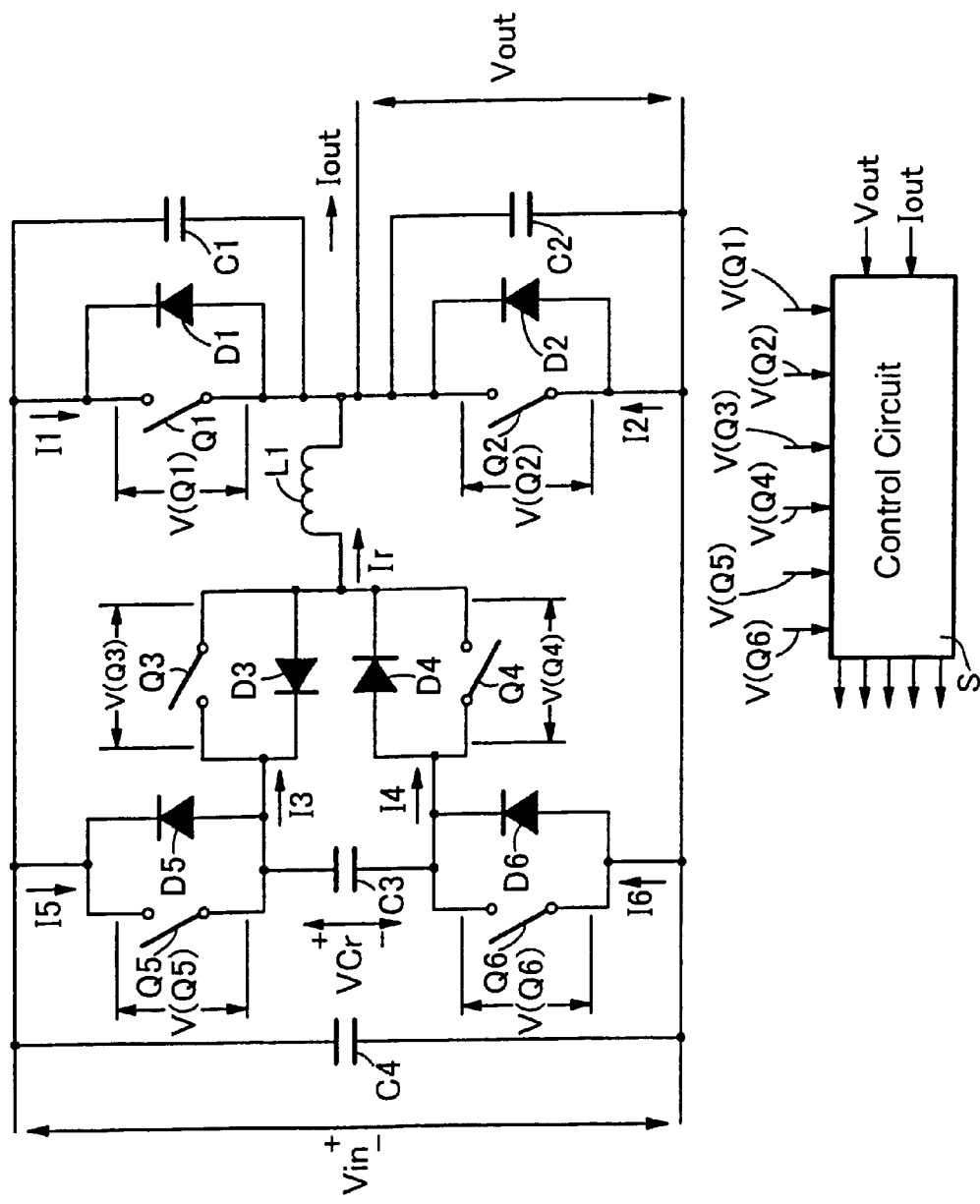
FIG. 1 is a circuit diagram showing the circuitry of a power conversion apparatus of the present invention.

Various embodiments of the present invention will now be described with referring to drawings. FIG. 1 is a circuit diagram showing a first embodiment of the present invention. This circuit includes first and second main switches Q1, Q2 which are connected in series with each other. One Q1 of the main switches is connected with the positive side of a DC power supply $V_{in}$, and the other one Q2 of main switches is connected with the negative side of the DC power supply $V_{in}$. A Diode D1 is connected in parallel with the main switches Q1, and a diode D2 is connected in parallel with the main switches Q2. Each of the diodes D1, D2 is arranged to become reverse biased with respect to the DC power supply, that is, their forward directions are aligned with respect to the positive side of the DC power supply $V_{in}$. Main-switch snubber capacitors C1, C2 are connected in parallel with the main switches Q1, Q2, respectively. A capacitor C4 serving as the DC power supply $V_{in}$ is connected in parallel with the series-connected main switches Q1, Q2. An output $V_{out}$ is picked up from the junction between the main switches Q1, Q2.

The illustrated circuit employs an auxiliary resonant commutation circuit. This auxiliary resonant commutation circuit includes first and second auxiliary switches Q5, Q3 connected in series with each other. The first auxiliary switch Q5 is connected with the positive side of the DC power supply $V_{in}$. The second auxiliary switch Q3 is connected with the junction between the main switches Q1, Q2 through a resonant inductor L1. Diodes D5, D3 are connected in parallel with the first and second auxiliary switches Q5, Q3, respectively, so as to become reverse biased with respect to the DC power supply $V_{in}$. The auxiliary resonant commutation circuit includes third and fourth auxiliary switch Q6, Q4 connected in series with each other. One of ends of the third auxiliary switch Q6 is connected with the negative side of the DC power supply $V_{in}$. The fourth auxiliary switch Q4 is connected with one of the ends of the resonant inductor L1. Diodes D6, D4 are connected in parallel with the third and fourth auxiliary switches Q6, Q4, respectively, so as to become reverse biased with respect to the DC power supply $V_{in}$. An auxiliary resonant commutation circuit snubber capacitor (hereinafter referred to as "auxiliary resonant snubber capacitor) C3 is connected between the first and third auxiliary switches Q5, Q6.

The illustrated circuit further includes a control circuit S for generating a switching signal for controlling each switching operation of the switches. The control circuit S receives a load current $I_{out}$ and a load voltage $V_{out}$ as an input signal, and then calculates the switching timing of the main switches Q1, Q2 to generate a switching signal. A voltage detector is provided to each of the switches to detect the voltage across each of them. The control circuit S receives the voltage signal as an input signal from these voltage detectors. Then, the control circuit S outputs the switching signal for controlling the switching operation of each of the switches.

Figure 2:
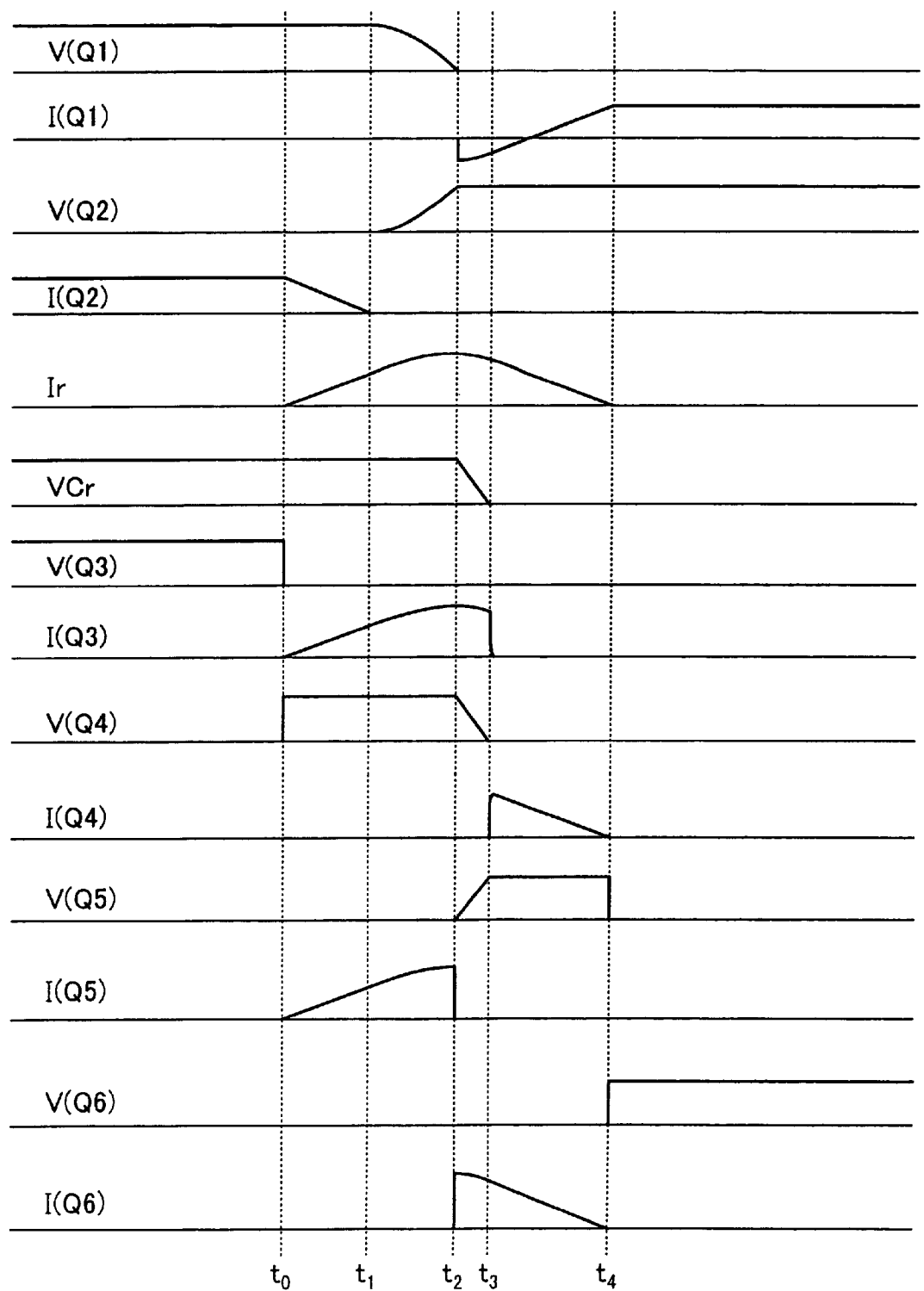
FIG. 2 illustrates waveforms in ON-state of a main switch when the initial voltage of a snubber capacitor of an auxiliary resonant commutation circuit in the circuitry of FIG. 1 is approximately equal to the voltage of a DC power supply.

FIG. 2 shows waveforms of the above circuit. In this figure, given that the load current $I_{out}$ is refluxed from the direction indicated by the arrows in FIG. 1 through the diode D2 connected in parallel with the second main switch Q2, in the period between the time the second main switch Q2 is turned off from its ON-state and the time before the first main switch Q1 is subsequently turned on. When the initial voltage of the snubber capacitor C3 in the auxiliary resonant commutation circuit is approximately equal to the voltage of the DC power supply $V_{in}$, if the first and second auxiliary switches Q5, Q3 are turned on at the time $t_0$, the second auxiliary switch Q3 is turned on, the voltage of the DC power supply $V_{in}$ is applied to the resonant inductor L1 and thereby the inductor current Ir is linearly increased. Simultaneously, the current passing through the diode D2 is reduced by this increased amount.

At the time $t_1$, the inductor current Ir becomes equal to the load current $I_{out}$. At this moment, resonation is caused by the resonant inductor L1 and main-switch snubber capacitors C1, C2. Thus, the voltage across the diode D2 connected in parallel with the second main switch Q2 starts increasing. At the time $t_2$, the diode D1 connected in parallel with the first main switch Q1 is biased in the forward direction and thereby the inductor current Ir is refluxed to the inductor L1 from the diode D1 through the first and second auxiliary switches Q5, Q3. On and As shown in FIG. 2, after the time $t_2$, the voltage across the first main switch Q1 is approximately zero. Thus, "zero-voltage turn-on" of the first main switch Q1 can be achieved by turning on the first main switch Q1 after the time $t_2$.

When the first auxiliary switch Q5 is turned off after turning on the first main switch Q1, the current flows along the path from the diode D6 connected in parallel with the third auxiliary switch Q6, through the auxiliary resonant snubber capacitor C3 to the second auxiliary switch Q3. This leads to discharge in the snubber capacitor C3, and thereby the voltage across the first auxiliary switch Q5 is increased with gradient. Thus, the soft-switching can also be achieved in the first auxiliary switch Q5.

At the time $t_3$, the diode D6 connected in parallel with the third auxiliary switch Q6 is biased in the forward direction. Thus, the exited energy in the resonant inductor L1 is regeneratively returned to the DC power supply $V_{in}$ through the diodes D6, D4, D1 connected in parallel with the third auxiliary switch Q6, the fourth auxiliary switch Q4 and the first main switch Q1, respectively.

Figure 3:
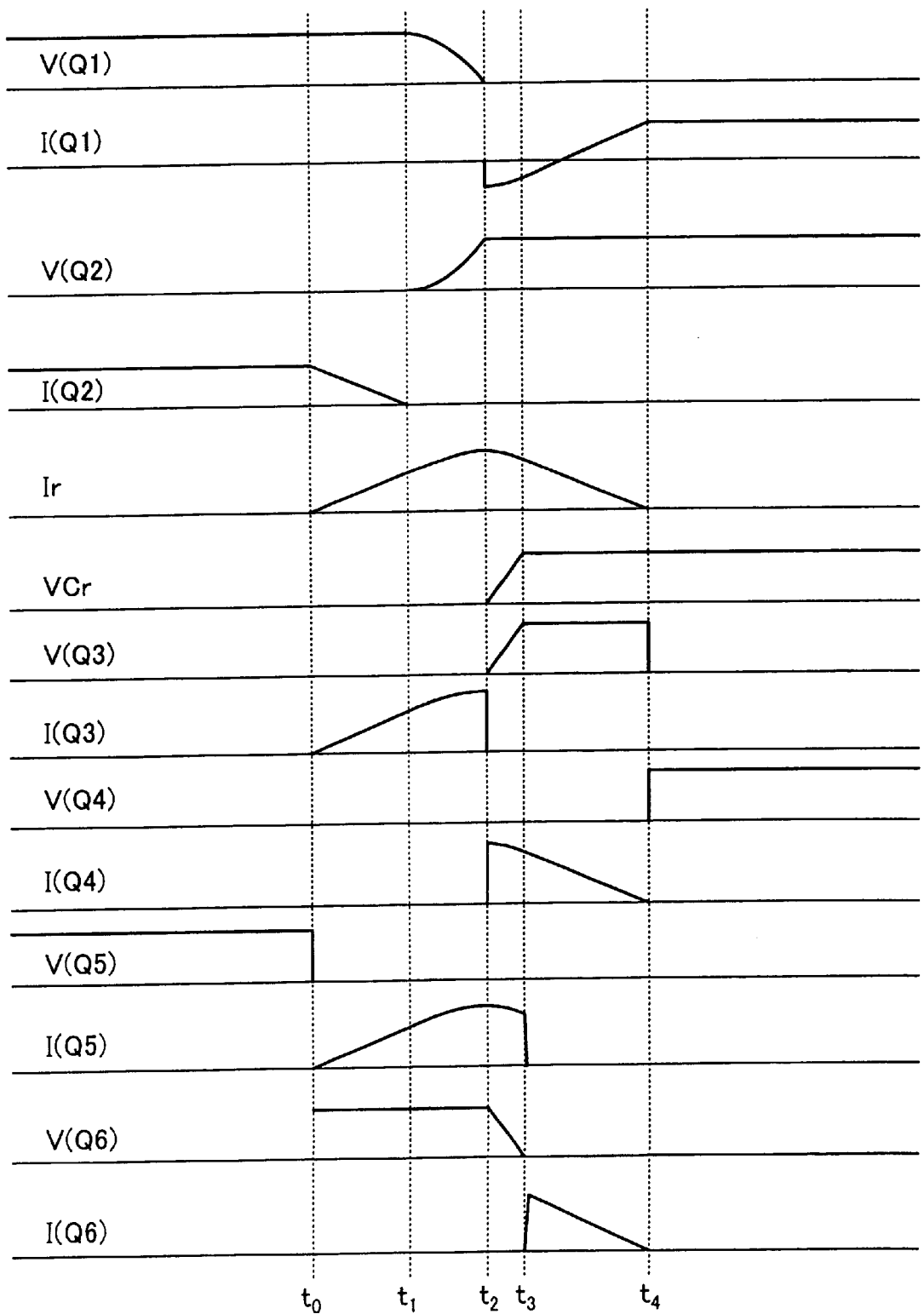
FIG. 3 illustrates waveforms in ON-state of the main switch when the initial voltage of the snubber capacitor of the auxiliary resonant commutation circuit in the circuitry of FIG. 1 is approximately equal to zero.

FIG. 3 shows waveforms of each part of the circuit when the initial voltage Vcr of the auxiliary resonant snubber capacitor C3 is approximately zero. Operations from the time to $t_0$ the time $t_2$ are the same as those shown in FIG. 2. When the second auxiliary switch Q3 is turned off after turning on the first main switch Q1 on and after the time $t_2$, the current flows along the path from the first auxiliary switch Q5 through the snubber capacitor C3 and the diode D4 connected in parallel with the fourth auxiliary switch Q4 to the resonant inductor L1. Thus, the inductor current Ir charges the snubber capacitor C3 with passing therethrough, and thereby the voltage across the second auxiliary switch Q3 is increased with gradient. Consequently, the soft-switching can also be achieved in the second auxiliary switch Q3.

At the time $t_3$, the diode D6 connected in parallel with the third auxiliary switch Q6 is biased in the forward direction. Then, the accumulated energy in the inductor L1 is regeneratively returned to the DC power supply $V_{in}$ along the path from said diode 6 through the diode D4 connected in parallel with the fourth auxiliary switch Q4 and the resonant inductor L1 to the diode D1 connected in parallel with the first main switch Q1.

Figure 4:
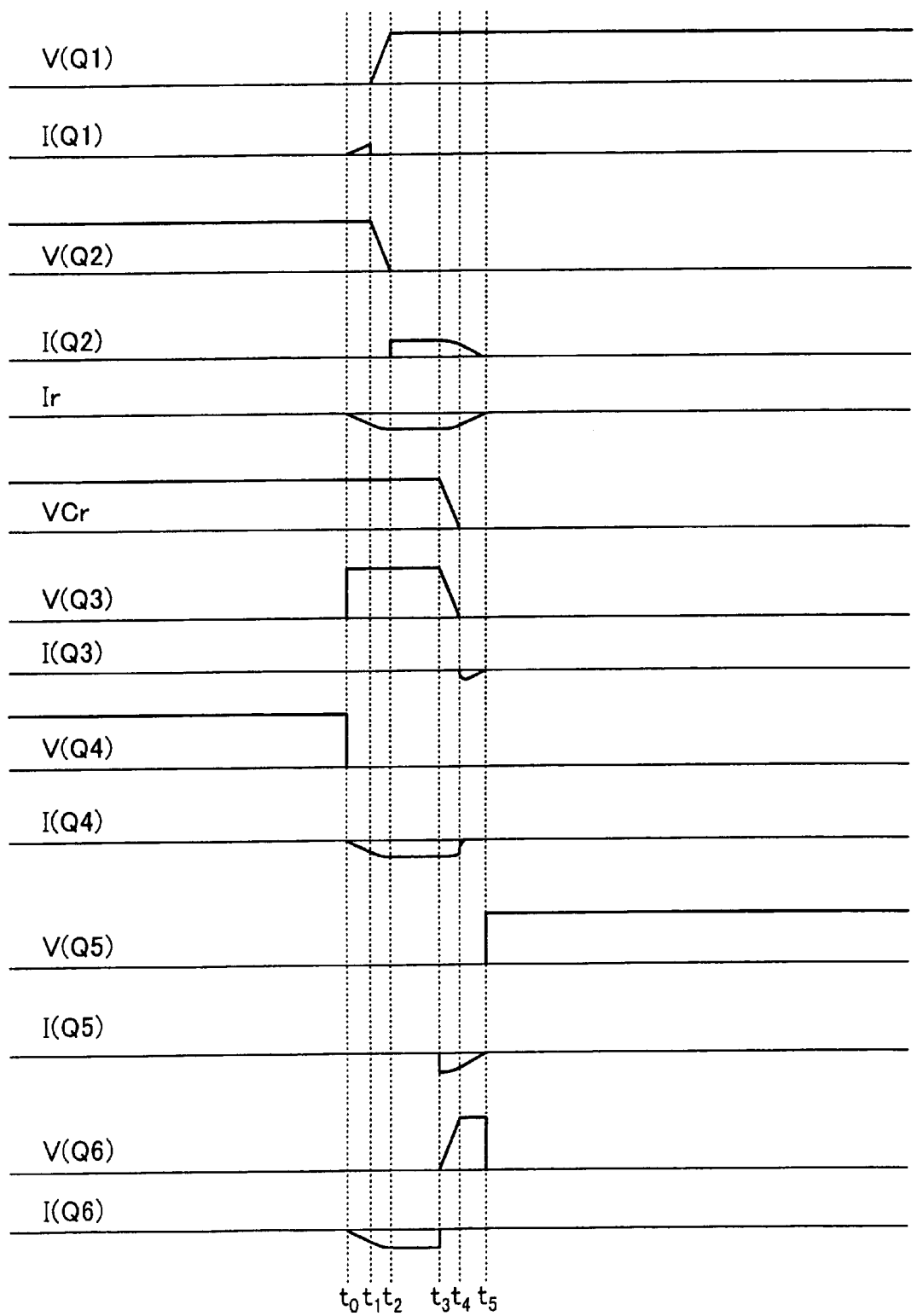
FIG. 4 illustrates waveforms in OFF-state of the main switch when the initial voltage of the snubber capacitor of the auxiliary resonant commutation circuit in the circuitry of FIG. 1 is approximately equal to the voltage of the DC power supply.

FIG. 4 is a waveform diagram showing the commutating operation in ON-state of the first main switch Q1. When the load current is less than a threshold current Ith defined by the following formula, the following operation is performed.

$$I_{th} = Cr \times V_{in} / t_{max}$$

where, $I_{th}$ is the threshold, Cr being the capacity of the main-switch snubber capacitor when the snubber capacitor is connected in parallel with the main switch, $V_{in}$ being the voltage of the DC power supply, and $t_{max}$ being the maximum allowable value of the time required for the load current to commute from one of the first and second main switches to the other of them.

First, given that the auxiliary resonant snubber capacitor C3 is charged at the initial voltage approximately equal to the voltage of the DC power supply $V_{in}$. In this state, when the third and fourth auxiliary switches Q6, Q4 are turned on at the time $T_0$, the voltage of the DC power supply $V_{in}$ is applied additionally to the path along the first main switch Q1, the resonant inductor L1, the fourth auxiliary switch Q4 and the third auxiliary switch Q3, and thereby the inductor current Ir is linearly increased. At the time $T_1$, the inductor current Ir goes up to the threshold current $I_{th}$. At this moment, if the first main switch Q1 is turned off, resonant is caused by the resonant inductor L1 and snubber capacitors C1, C2, and the voltage across the first main switch Q1 is increased with gradient. Thus, the soft-switching can be achieved in the first main switch Q1.

At the time $T_2$, the diode D2 connected in parallel with the second main switch Q2 is biased in the forward direction. Thus, the current is refluxed along the path from the diode D2 through the inductor Ir, the fourth auxiliary switch Q4 and the third auxiliary switch Q6 to the diode D2. By turning on the second main switch Q2 on and after the time $T_2$, the zero-voltage turn-on can be achieved in the main switch Q2.

Subsequently, when the third auxiliary switch Q6 is turned off at the time $T_3$, the current flows along the path from the fourth auxiliary switch Q4 through the snubber capacitor C3 to the diode D5 connected in parallel with the first auxiliary switch Q5, and thereby the charged voltage of the snubber capacitor C3 is discharged. Thus, the voltage across the third auxiliary switch Q6 is increased with gradient, and the soft-switching can be achieved in the third auxiliary switch Q6.

At the time $T_4$, the diode D3 connected in parallel with the second auxiliary switch Q3 is biased in the forward direction, and the accumulated energy in the resonant inductor L1 is regeneratively returned to the DC power supply $V_{in}$ along the path from the second main switch Q2 through the inductor Ir, the diode D3 and the diode D5 connected in parallel with the first auxiliary switch Q5.

Figure 5:
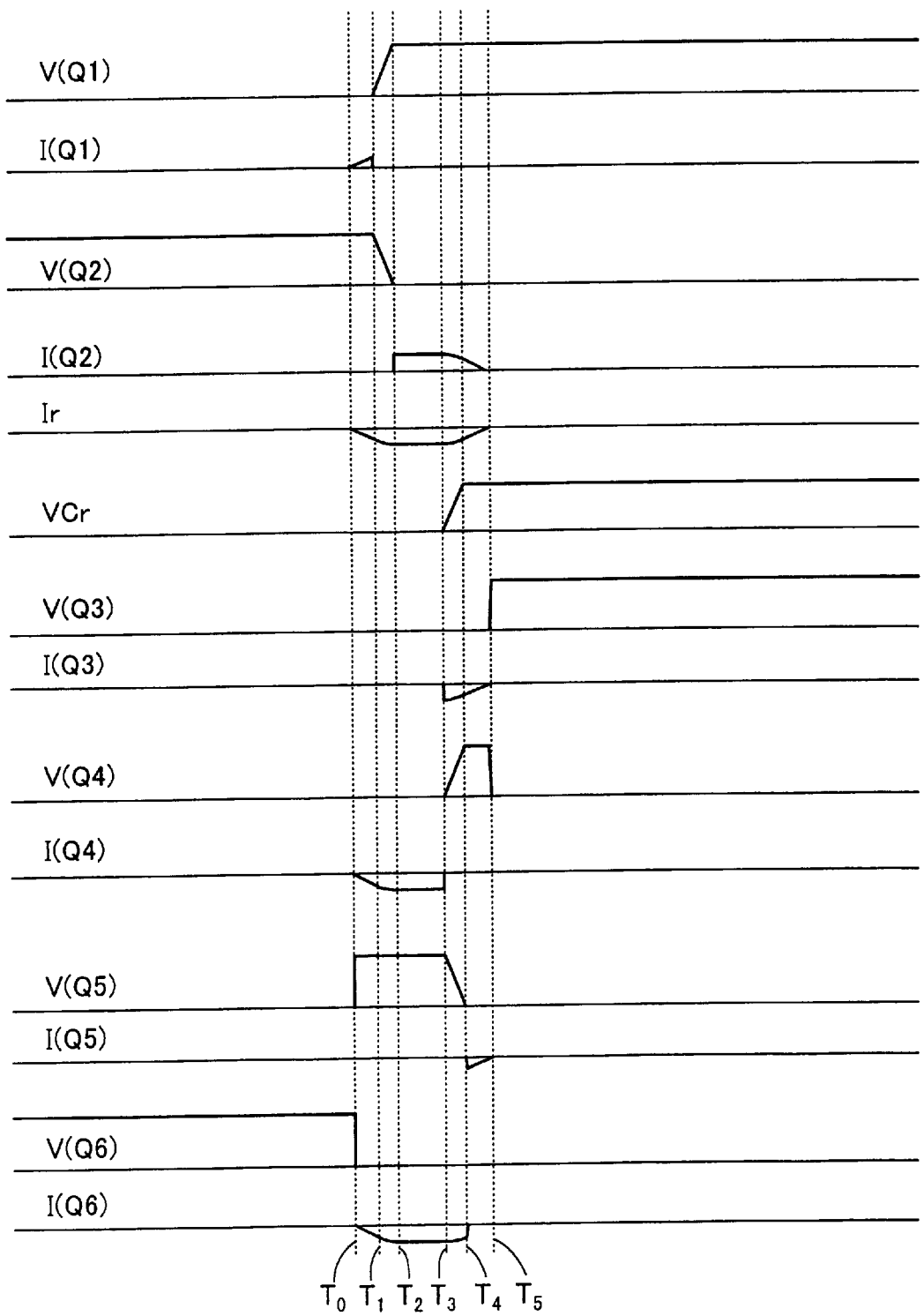
FIG. 5 illustrates waveforms in OFF-state of the main switch when the initial voltage of the snubber capacitor of the auxiliary resonant commutation circuit in the circuitry of FIG. 1 is approximately equal to zero.

FIG. 5 shows waveforms in the state when the initial voltage Vcr of the auxiliary resonant snubber capacitor C3 is approximately zero. The operations between the time $T_0$ and the time $T_3$ are the same as those shown in FIG. 4. In the operations of FIG. 5, the fourth auxiliary switch Q4 is turned off after the second main switch Q2 is turned on at the time $T_3$. As a result, the current flows along the path from the resonant inductor L1 through the diode D3 connected in parallel with the second auxiliary switch Q3 and the snubber capacitor C3 to the third auxiliary switch Q6, and thereby the snubber capacitor C3 is charged. Thus, the voltage across the fourth auxiliary switch Q4 is increased with gradient, and the soft-switching can be achieved in said auxiliary switch Q4.

At the time $T_4$, the diode D5 connected in parallel with the first auxiliary switch Q5 is biased in the forward direction, and the accumulated energy in the resonant inductor L1 is regeneratively returned along the path from the second main switch Q2 through the inductor L1, the diode D3 and the diode D5.

When the load current is larger than the aforementioned threshold, the auxiliary resonant commutation circuit is not activated in the time period from the ON-state of the first main switch Q1 6 to the completion of the reflux of the load current through the diode D2. In this case, when the first main switch Q1 is turned off, the voltage at the junction between the first and second main switches Q1, Q2 is varied with gradient by the action of the snubber capacitors C1, C2. Thus, the soft-switching can be achieved in the main switch Q1.

As described above, in the course of the commutation of the load current not only from the diode D2 to the main switch Q1 but also from the main switch Q1 to the diode D2, the soft-switching can be achieved in all of the switches. Furthermore, all of the accumulated energy in the resonant inductor for the commutation is regeneratively returned to the DC power supply after the completion of the commutation. Thus, in the circuit using the capacitor C4 as the DC power supply, even if the load current is varied at low frequency due to the operation of the inverter, no low-frequency ripple is generated at the capacitor C4 by the operation of the auxiliary resonant commutation circuit. This eliminates the need for increasing the capacity of the capacitor C4.

Figure 6:
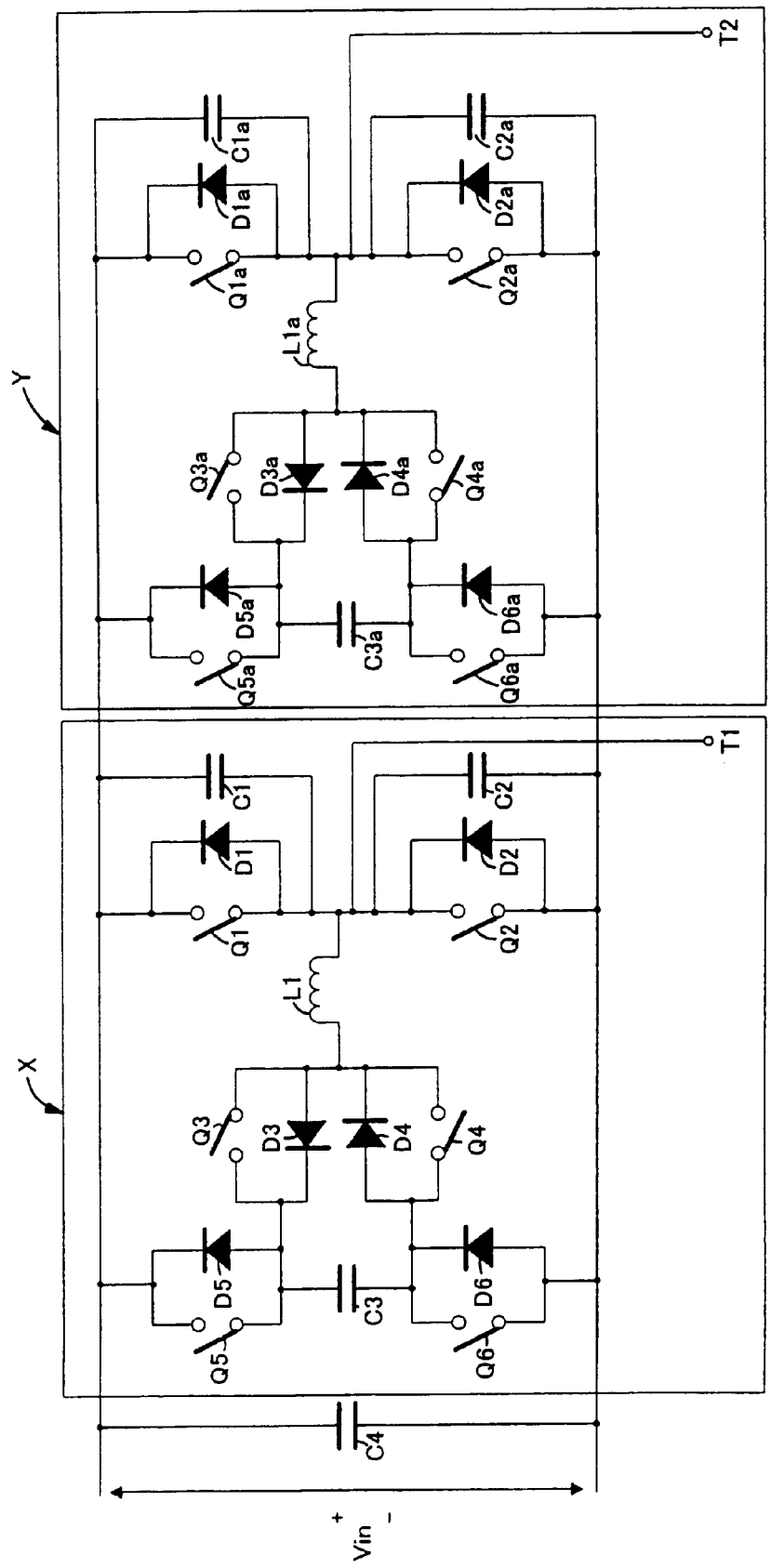
FIG. 6 is a circuit diagram showing an application of the circuit of the present invention.

FIG. 6 shows a second embodiment of the present invention. This embodiment is a single-phase inverter arrangement in which a pair of inverters each having the circuitry as shown in FIG. 1 are connected in parallel with each other. In FIG. 6, an inverters X and inverter Y are identical in circuitry. The same elements or components as those of the circuit in FIG. 1 are defined by the same numerals or codes, and the codes of the inverter Y are defined by adding an affix "a". The Inverters X, Y have output terminals T1, T2, respectively.

Figure 7:
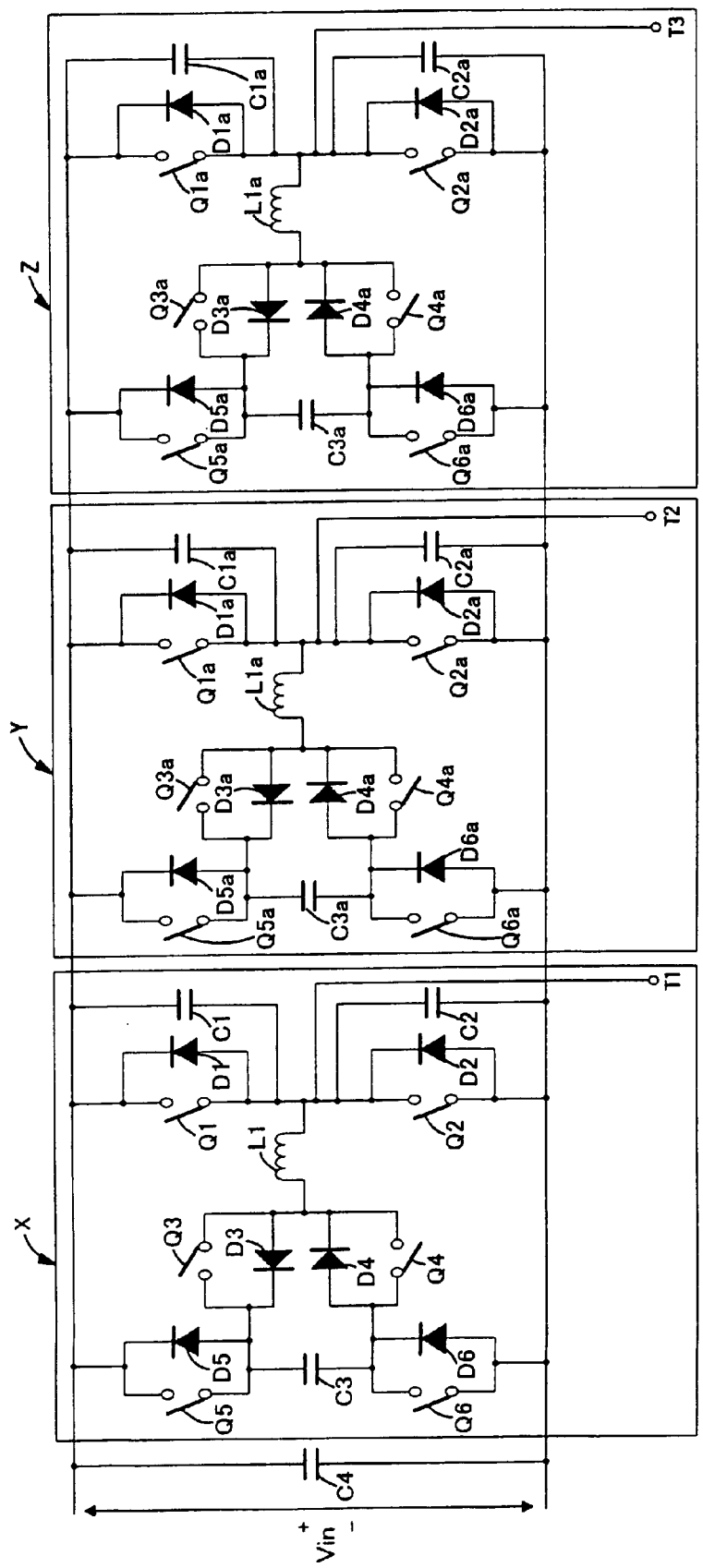
FIG. 7 is a circuit diagram showing another application of the circuit of the present invention.

FIG. 7 shows a third embodiment of the present invention. This embodiment is an example of a three-phase inverter in which three inverters each having the circuitry as shown in FIG. 1 are connected in parallel with each other. Each of the inverters X, Y is the same as that of FIG. 6, and is defined by the same codes as those of FIG. 6. In the example of FIG. 7, a third inverter Z having an output terminal T3 is additionally provided. Each elements of the third inverter Z is defined by adding an affix "b" to the same code as that of FIG. 1, and their description will be omitted.

Figure 8:
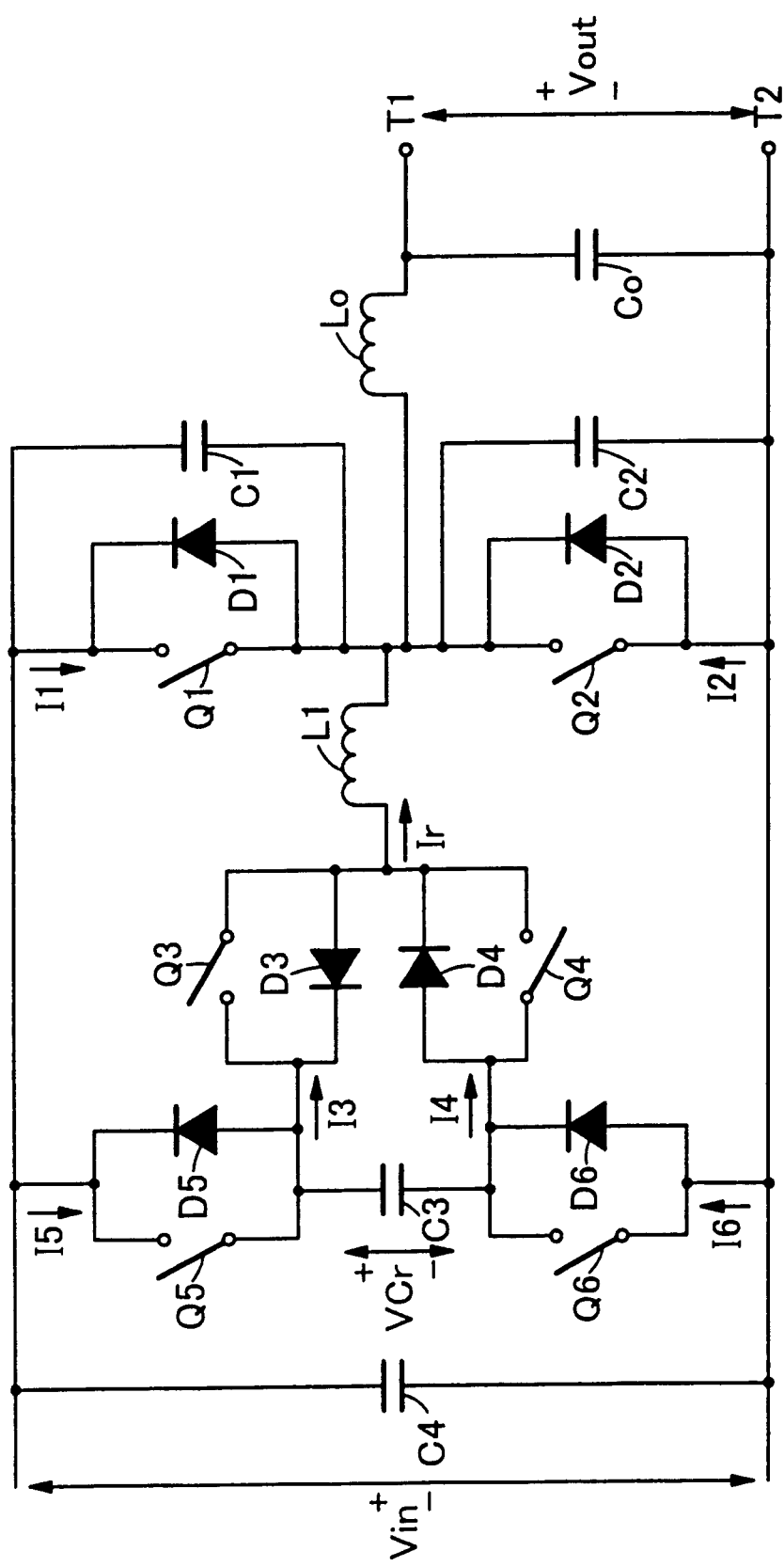
FIG. 8 is a circuit diagram showing still another application of the circuit of the present invention.

FIG. 8 shows an example in which a down converter is formed by using the circuitry of FIG. 1. A filter composed of a smoothing reactor L0 and a smoothing capacitor C0 is connected with both ends of the second main switch Q2 of the circuit shown in FIG. 1, and output terminals T1, T2 are provided to both ends of the smoothing capacitor C0, respectively. According to this circuit, the auxiliary resonant commutation circuit can prevent undesirable variance in voltage of the input capacitor C4, such as ripple, in any load conditions ranging from light load to heavy load.

Figure 9:
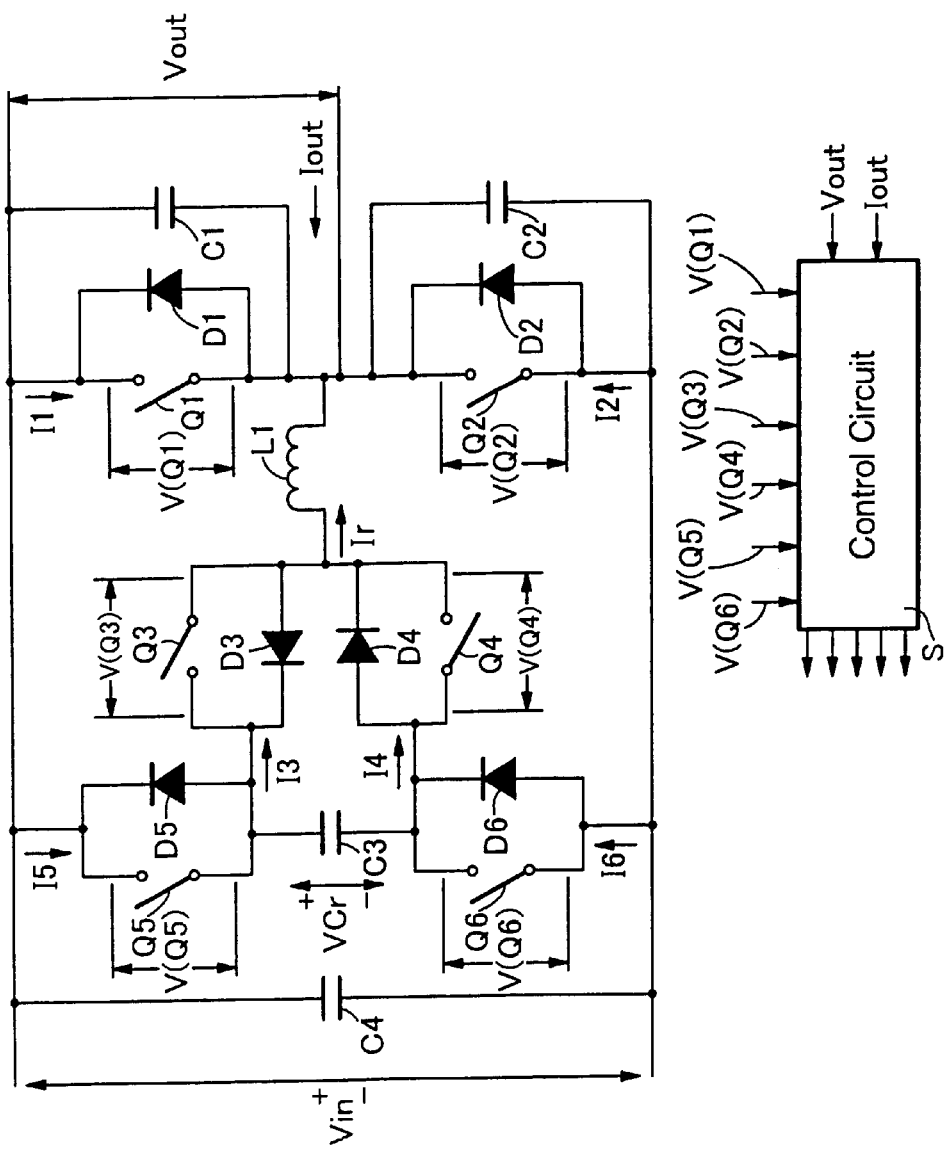
FIG. 9 is a circuit diagram showing a modification of the circuit of FIG. 1.

FIG. 9 is a circuit diagram showing a modification of the first embodiment of the present invention. This modification is different from the circuit of FIG. 1 just in that the output is picked up from both ends of the first main switch Q1. Thus, the detailed description about this circuitry will be omitted.

Figure 10:
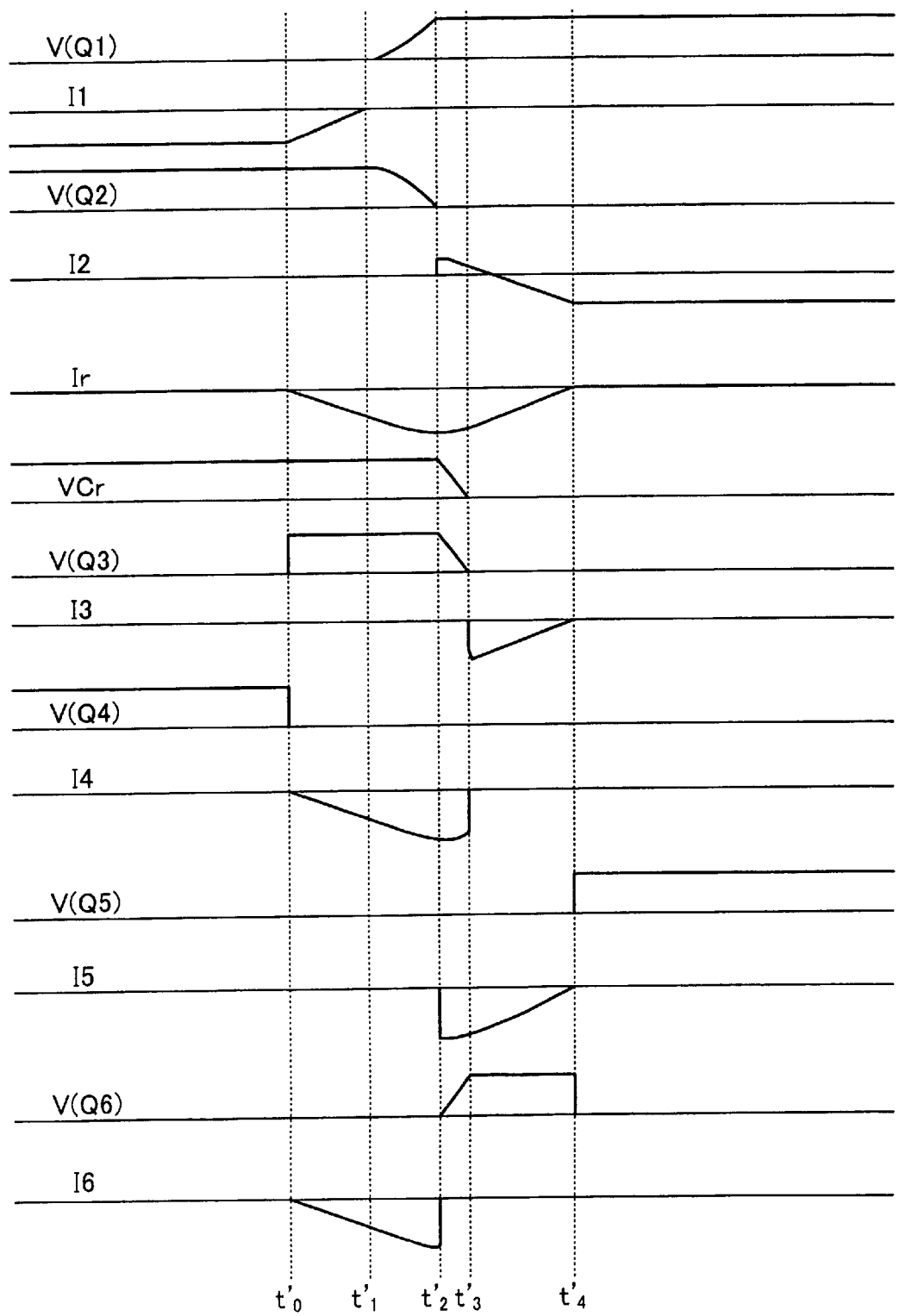
FIG. 10 illustrates waveforms in ON-state of a main switch when the initial voltage of a snubber capacitor of an auxiliary resonant commutation circuit in the circuitry of FIG. 9 is approximately equal to the voltage of a DC power supply.

FIG. 10 shows waveforms of the circuit of FIG. 9. In FIG. 10, given that the load current $I_{out}$ is fluxed in the direction indicated by the arrow shown in FIG. 9 through the diode D1 connected in parallel to the first main switch Q1, in the period between the time the first main switch Q1 is turned off from its ON-state and the time before the second main switch Q2 is subsequently turned on. When the initial voltage of the snubber capacitor C3 of the auxiliary resonant commutation circuit is approximately equal to the voltage of the DC power supply $V_{in}$, if the third auxiliary switches Q6 and the fourth auxiliary switches Q4 are turn on at the time $t'_{Q1}$ the voltage of the DC power supply $V_{in}$ will be applied to the resonant inductor L1. Thus, the inductor current Ir is linearly increased, and the current of the diode D1 is simultaneously reduced by the increment.

At the time $t'_1$, the inductor current Ir becomes equal to the load current $I_{out}$. At this time, resonance is caused by the resonant inductor L1 and the main-switch snubber capacitors C1, C2. Consequently, the voltage across the diode D1 connected in parallel to the first main switch Q1 starts going up. At the time $t'_2$, the diode D2 connected in parallel to the second main switch Q2 is biased in the forward direction, and the inductor current Ir is refluxed from the diode D2 to the inductor L1 through the second auxiliary switch Q6 and the second auxiliary switch Q4. On and after the time $t'_2$, the voltage across the second main switch Q2 is approximately zero as shown in FIG. 10. Thus, by turning on the second main switch Q2 on and after the time $t'_2$, the "zero-voltage turn-on" can be achieved in the second main switch Q2.

When the second auxiliary switch Q6 is turned off after turning on the second main switch Q2, the current flows along the path from the resonant inductor L1 through the fourth auxiliary switch Q4 and the auxiliary resonant snubber capacitor C3 to the diode D5 connected in parallel with the first auxiliary switch Q5, and thereby the snubber capacitor C3 is discharged. Thus, the voltage across the third auxiliary switch Q6 is increased with gradient, and the soft-switching can also be achieved in the third auxiliary switch Q6.

At the time $t'_3$, the diode D3 connected in parallel with the second auxiliary switch Q3 is biased in the forward direction. Thus, the excited energy in the resonant inductor L1 is regeneratively returned to the DC power supply $V_{in}$ through the diodes D5, D3, D2 connected in parallel with the first auxiliary switch Q5, the second auxiliary switch Q3, the second main switch Q2, respectively.

Figure 11:
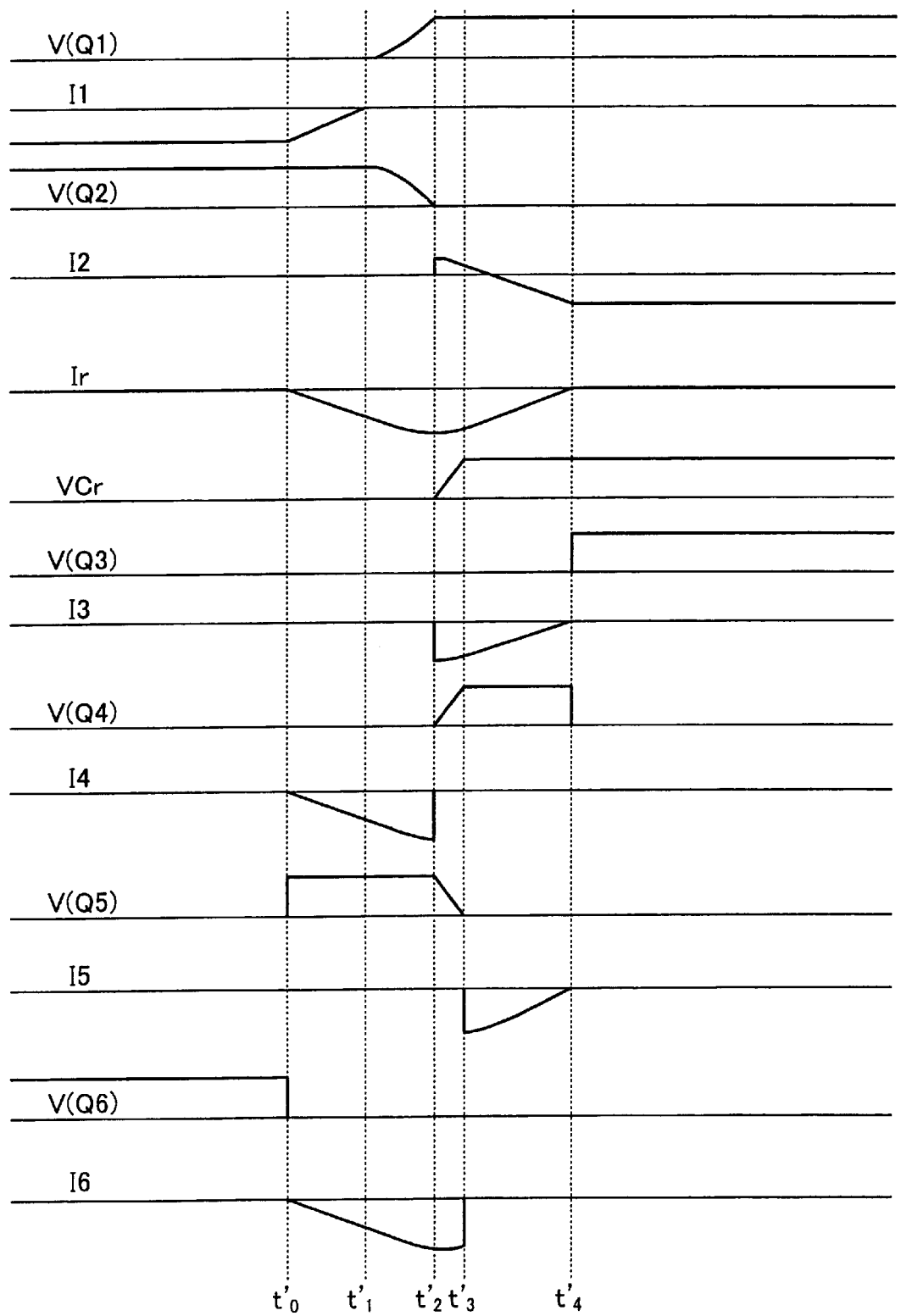
FIG. 11 illustrates waveforms in ON-state of the main switch when the initial voltage of the snubber capacitor of the auxiliary resonant commutation circuit in the circuitry of FIG. 9 is approximately equal to zero.

FIG. 11 shows waveforms of each part of the circuit when the initial voltage Vcr of the auxiliary resonant snubber capacitor C3 is approximately zero. The operations from the time $t'_0$ to the time $t'_2$ are the same as those shown in FIG. 10. When the fourth auxiliary switch Q4 is turned off after turning on the second main switch Q2 on and after the time $t'_2$, the current flows along the path from the resonant inductor L1 through the diode D3 connected in parallel with the second auxiliary switch Q3 and the snubber capacitor C3 to the third auxiliary switch Q6. Thus, the inductor current Ir passes through the snubber capacitor C3 with charging it, and the voltage across the fourth auxiliary switch Q4 is increased with gradient. Consequently, the soft-switching can also be achieved in the fourth auxiliary switch Q4.

At the time $t'_3$, the diode D5 connected in parallel with the first auxiliary switch Q5 is biased in the forward direction. Thus, the accumulated energy in the inductor L1 is regeneratively returned to the DC power supply $V_{in}$ along the path from said diode D5 through the diode D3 connected in parallel with the second auxiliary switch Q3 and the resonant inductor L1 to the diode D2 connected in parallel with the second main switch Q2.

Figure 12:
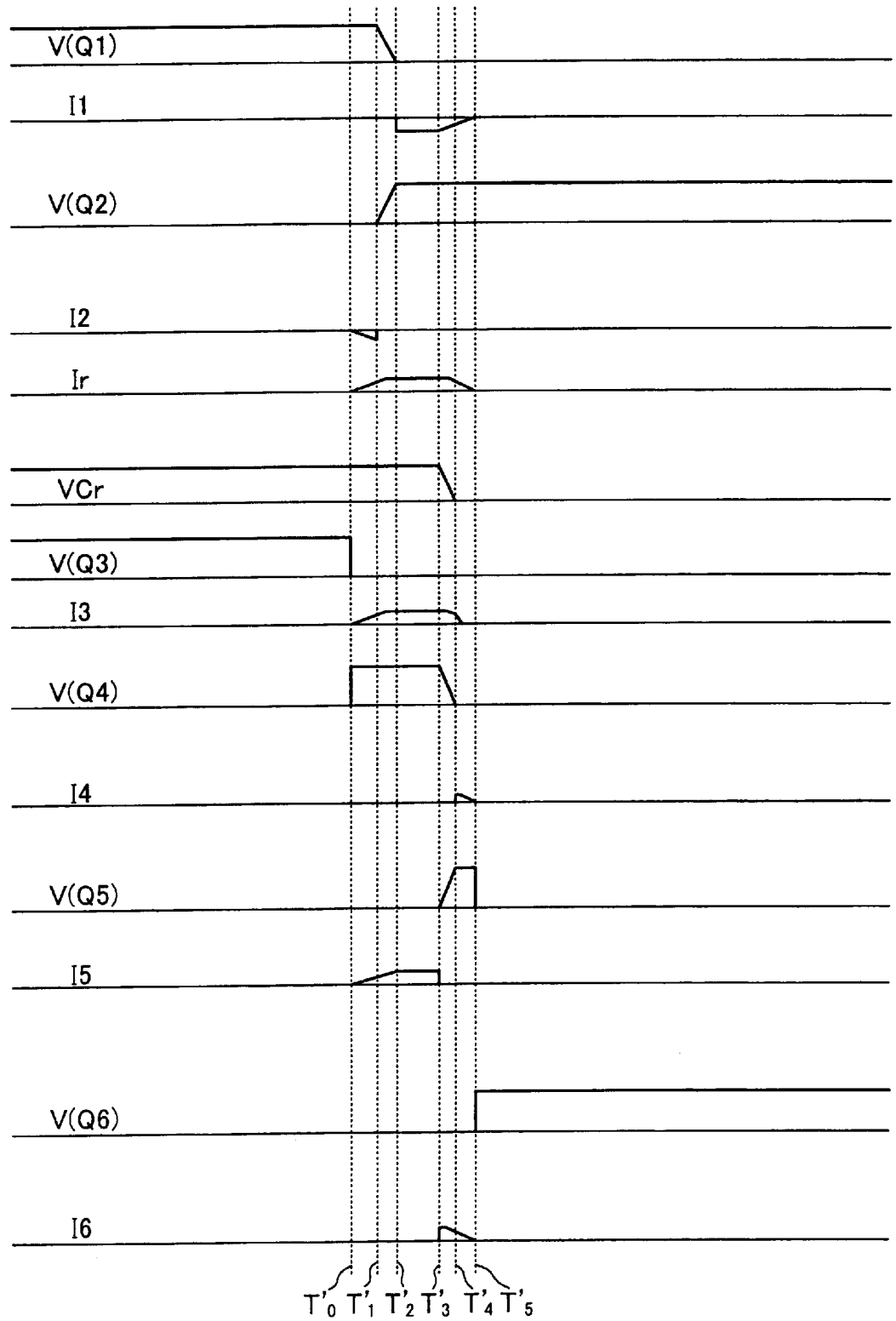
FIG. 12 illustrates waveforms in OFF-state of the main switch when the initial voltage of the snubber capacitor of the auxiliary resonant commutation circuit in the circuitry of FIG. 9 is approximately equal to the voltage of the DC power supply.

FIG. 12 is a waveform diagram showing a commutation operation in ON-state of the second main switch Q2. When the load current is less than a threshold current Ith defined by following formula, the following operation is performed;

$$I_{th} = Cr \times V_{in}/t_{max}$$

where, $I_{th}$ is the threshold, Cr being the capacity of the main-switch snubber capacitor when the snubber capacitor is connected in parallel to the main switch, $V_{in}$ being the voltage of the DC power supply, $t_{max}$ being the maximum allowable value of time required for the load current to commutate from one of the first and second main switches to the other of them.

First, given that the auxiliary resonant snubber capacitor C3 is charged at the initial voltage approximately equal to the voltage of the DC power supply $V_{in}$. In this state, when the first auxiliary switch Q5 and the second auxiliary switch Q3 are turn on at the time $T'_0$, the voltage of the DC power supply $V_{in}$ is applied to the path through the first auxiliary switch Q5, the second auxiliary switch Q3, the resonant inductor L1 and the second main switch Q2. Thus, the inductor current Ir is linearly increased. At the time $T'_1$, the inductor current Ir goes up to the threshold current $I_{th}$. At this moment, when the second main switch Q2 is turned off, resonance is caused by the resonant inductor L1 and the snubber capacitors C1, C2, and thereby the voltage across the second main switch Q2 is increased with gradient. Consequently, the soft-switching can be achieved in the second main switch Q2.

At the time $T'_2$, the diode D1 connected in parallel with the first main switch Q1 is biased in the forward direction. Thus, the current is refluxed along the path from the diode D1 through the first auxiliary switch Q5, the second auxiliary switch Q3 and the inductor Ir to the diode D1. By turning on the first main switch Q1 on and after the time $T'_2$, the "zero-voltage turn-on" can be achieved in said main switch Q1.

Subsequently, when the third auxiliary switch Q5 is turned off at the time $T'_3$, the current flows along the path from the diode D6 connected in parallel with the third auxiliary switch Q6, through the snubber capacitor C3 to the second auxiliary switch Q3. Thus, the charged voltage of the snubber capacitor C3 is discharged, and thereby the voltage across the first auxiliary switch Q5 is increased with gradient. Consequently, the soft-switching can be achieved in the first auxiliary switch Q5.

At the time $T'_4$, the diode D4 connected in parallel with the fourth auxiliary switch Q4 is biased in the forward direction. Thus, the accumulated energy in the resonant inductor L1 is regeneratively returned to the DC power supply $V_{in}$ along the path from the diode D6 connected in parallel with the third auxiliary switch Q6 and said diode D4, through the inductor Ir and the first main switch Q1.

Figure 13:
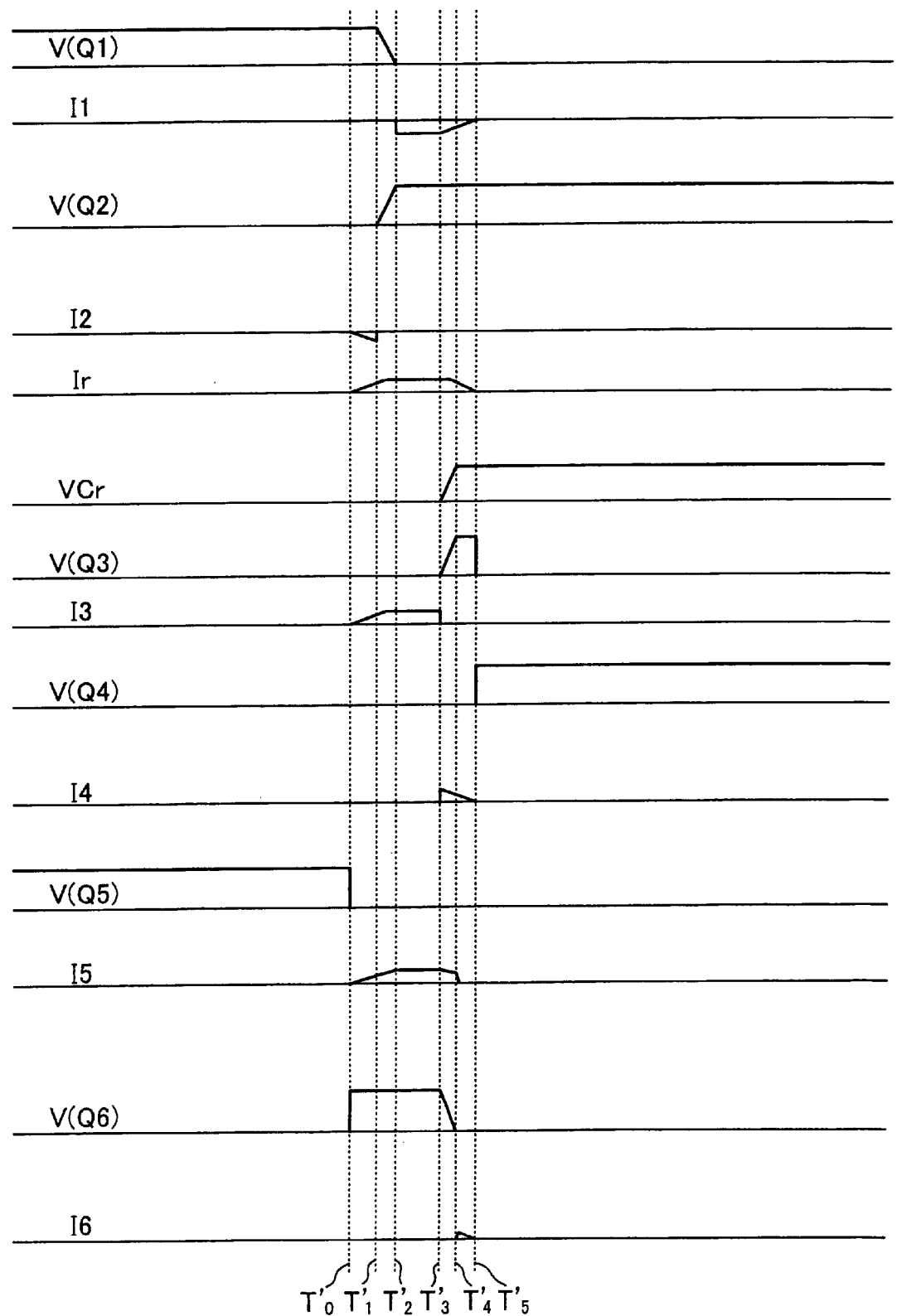
FIG. 13 illustrates waveforms in OFF-state of the main switch when the initial voltage of the snubber capacitor of the auxiliary resonant commutation circuit in the circuitry of FIG. 9 is approximately equal to zero.

FIG. 13 shows waveforms when the initial voltage Vcr of the auxiliary resonant snubber capacitor C3 is approximately zero. The operations from the time T'$_0$ to the time T'$_3$ are the same as those shown in FIG. 12. In the operations of FIG. 13, after turning on the first main switch Q1 at the time T'$_3$, the third auxiliary switch Q3 is turned off. As a result, the current flows along the path from the first auxiliary switch Q5 through the snubber capacitor C3 and the diode D4 connected in parallel with the fourth auxiliary switch Q4 to the resonant inductor L1, and thereby the snubber capacitor C3 is charged. Thus, the voltage across the second auxiliary switch Q3 is increased with gradient. Consequently, the soft-switching can be achieved in said auxiliary switch Q3.

At the time T'$_4$, the diode D6 connected in parallel with the third auxiliary switch Q6 is biased in the forward direction. Thus, the accumulated energy in the resonant inductor L1 is regeneratively returned along the path from the first main switch Q1 through the inductor L1, the diode D4 and the diode D6.

In the load current lager than the above threshold, the auxiliary resonant commutation circuit is not activated in the time period between the ON-state of the second main switch Q2 and the completion of the reflux of the load current through the diode D1. In this case, when the second main switch Q2 is turned off, the voltage at the junction between the first and second main switches Q1, Q2 is varied with gradient by the action of snubber capacitors C1, C2. Thus, the soft-switching can be achieved in the main switch Q2.

As described above, the soft-switching can be achieved in all of the switches in the course of the commutation of the load current not only from the diode D1 to the main switch Q2 but also from the main switch Q2 to the diode D1. Moreover, after commutation, all of the accumulated energy in the resonant inductor for commutation is regeneratively returned to the DC power supply. Therefore, in the circuit using the capacitor C4 as the DC power supply, even if the load current is varied at low frequency by the operation of the inverter, the auxiliary resonant commutation circuit operates to prevent the occurrence of any low frequency ripple in the capacitor C4. This eliminates the need for increasing the capacity of the capacitor C4.

Figure 14:
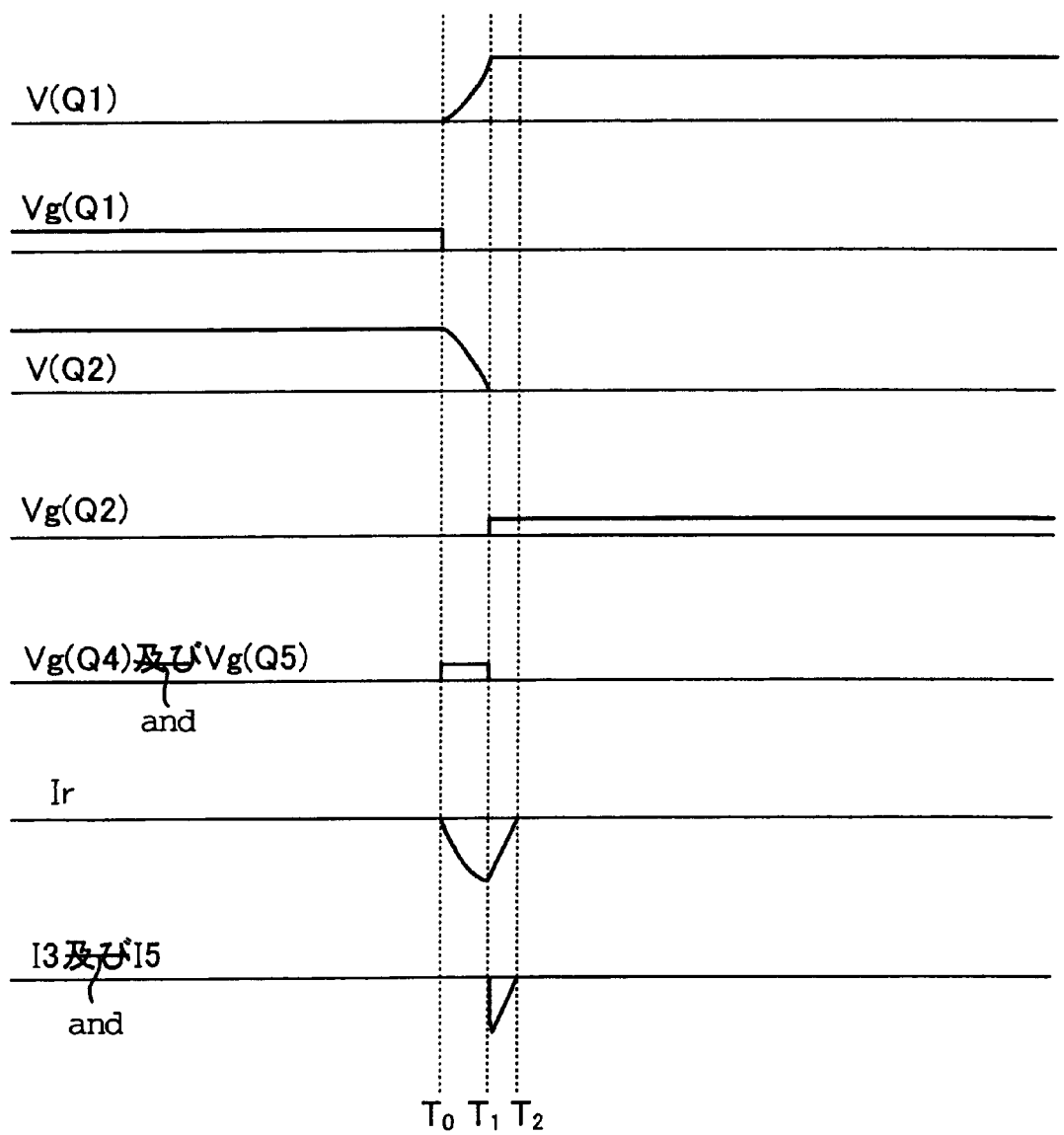
FIG. 14 illustrates waveforms showing another example of the control according to the present invention, in the same state as that in FIG. 4.
Figure 15:
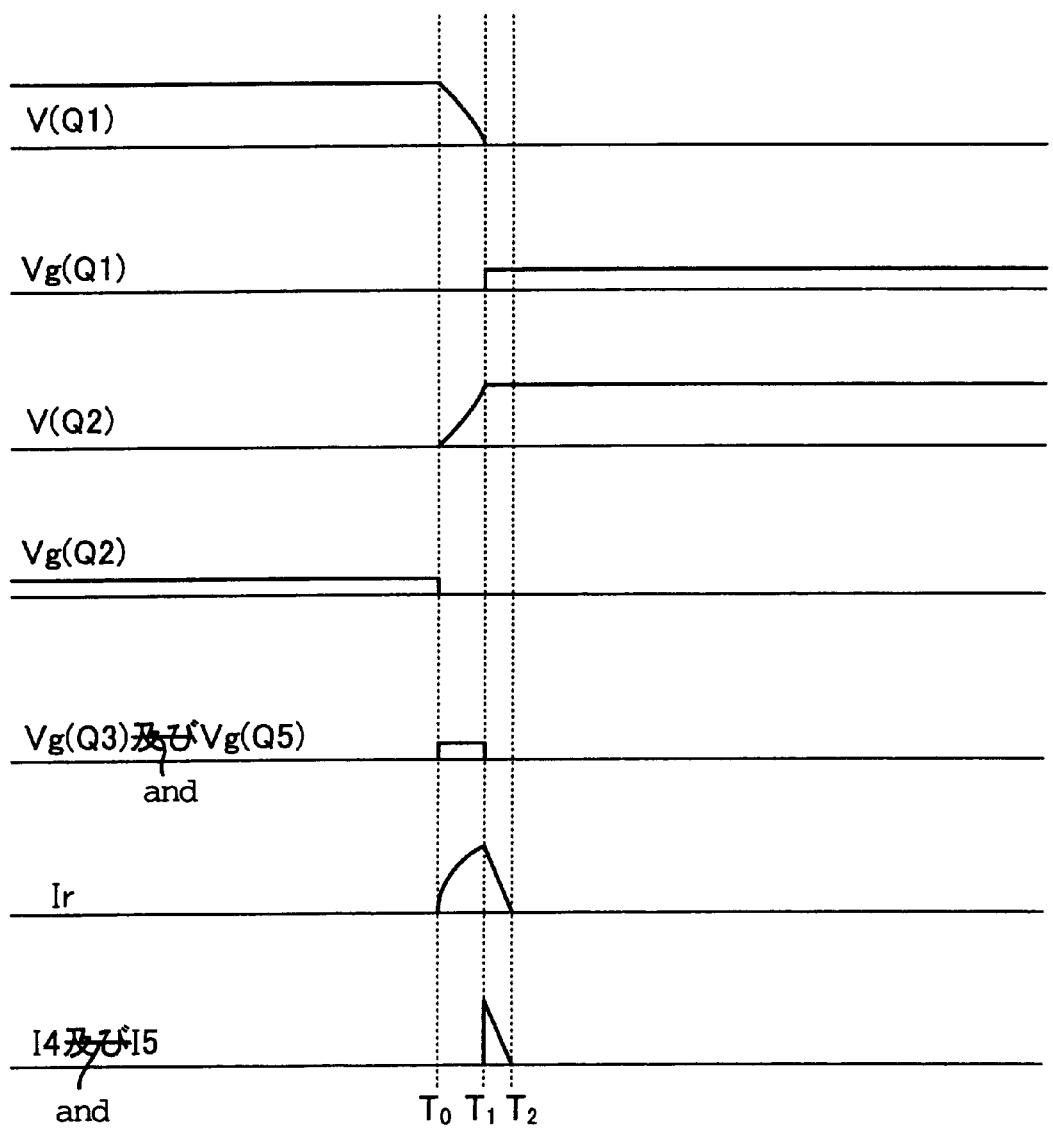
FIG. 15 illustrates waveforms showing still another example of the control according to the present invention, in the same state as that in FIG. 15.

FIGS. 14 and 15 show examples of another control according to the present invention. FIG. 14 corresponding to the aforementioned FIG. 4 shows a control in the circuit of FIG. 1. FIG. 15 corresponding to FIG. 11 shows a control in the circuit of FIG. 9.

In FIG. 14, Vg indicates a driving signal for the switches. First, given that the main switch Q1 is in ON-state. When the main switch Q1 is turned off, the main switch starts the commutation of the load current. However, when the load current is less than the threshold I$_{th}$, it takes time to commutate due to the snubber capacitor connected in parallel with the main switch, and thereby the main switch can be turned on with leaving voltage in the snubber capacitor. This causes a short-circuit loss because the accumulated energy in the capacitor is consumed by the main switch. In order to prevent this, the fourth and sixth auxiliary switches Q4, Q6 are turn on in conjunction with the turn-on of the main switch Q1 at the time T$_0$ in the waveform shown in FIG. 14. Then, resonance is caused by the resonant inductor L1 and the snubber capacitors C1, C2. By this resonance, the voltage across the main switch Q2 is reduced, and goes down to zero at the time T$_1$. Simultaneously, the resonant current Ir is refluxed along the path through the auxiliary switch Q4, the auxiliary switch Q6 and the diode D2. The "zero-voltage turn-on" can be achieved by turning on the main switch Q2 on and after the time T$_1$. Further, when the auxiliary switch Q4 is turned off on and after the time T$_1$, diodes D3, D5 are brought into conduction by the current Ir of the resonant inductor L1. Thus, the excited energy in the resonant inductor L1 is regeneratively returned to the input V$_{in}$, and the regeneration is completed at the time T$_2$. The above control prevents any short-circuit loss in light load current otherwise caused by the snubber capacitor. This control process is performed by voltage detection without detecting current. Thus, the detecting circuit can be simplified.

Referring to FIG. 15, Vg indicates a driving signal of the switches. At first, given that the main switch Q2 is in ON-state. When the main switch Q2 is turned off, the main switch starts to commutate by the load current. However, when the load current is less than the threshold I$_{th}$, it takes time to the commutation due to the snubber capacitor connected in parallel with the main switch, and thereby the main switch can be turned on with leaving voltage in the snubber capacitor. This causes a short-circuit loss because the accumulated energy in the capacitor is consumed by the main switch. In order to prevent this, the third and fifth auxiliary switches Q3, Q5 are turned in conjunction with the turn-off of the main switch Q2 at the time T$_0$ in the waveform shown in FIG. 15. Then, resonance is caused by the resonant inductor L1 and the snubber capacitors C1, C2. By this resonance, the voltage across the main switch Q1 is reduced, and goes down to zero at the time T$_1$. Simultaneously, the resonant current Ir is refluxed along the path through the auxiliary switches Q3, Q5 and the diode D1. By turning on the main switch Q1 on and after the time T$_1$, the zero-voltage turn-on can be achieved. When the auxiliary switch Q3 is turned off on and after the time T$_1$, the diodes D4, D6 are brought into conduction by the current Ir of the resonant inductor L1. Then, the excited energy in the resonant inductor L1 is regeneratively returned to the input V$_{in}$, and the regeneration is completed at the time T$_2$. The above control can prevent any short-circuit loss in light load current otherwise caused by the snubber capacitor. This control process can provide the same effect as that of the control in FIG. 14.

What is claimed is:

1. A power conversion apparatus including:
   at least a pair of main switches composed of serial-connected first and second main switches, one of the ends of said first main switch being connected with the positive side of a DC power supply, one of the ends of said second main switch being connected to the negative side of said DC power supply;
   a diode connected in parallel with each of said main switches so as to become reverse biased with respect to said DC power supply;
   a main-switch snubber capacitor connected in parallel with each of said main switches;
   a load connected with the junction between said pair of main switches; and
   a control circuit for forming a switching signal for controlling the switching operation of said main switches by using a load voltage and/or a load current as an input thereof, wherein said main switches are controllably switched according said switching signal from said control circuit so as to generate an output, said power conversion apparatus comprising:
   a first auxiliary resonant circuit including serial-connected first and second auxiliary switches and a resonant inductor connected in series with said second auxiliary switch, said first auxiliary resonant circuit being connected with each of the positive side of said DC power supply and the junction between said pair of main switches;

a diode connected to each of said first and second auxiliary switches so as to become reverse biased with respect to said DC power supply; and voltage detecting means for detecting the voltage across each of said main switches and auxiliary switches; wherein said control circuit is applied with a voltage signal as an input representing said voltage across each of said main switches and auxiliary switches from said voltage detecting means;

said control circuit being adapted to provide a turn-on signal to said first and second auxiliary switches according to said input before a turn-on signal as the switching signal is provided to said first main switch;

said control circuit being adapted to provide the turn-on signal to said first and second auxiliary switches when the load current passes through said diode connected in parallel with said second main switch, so as to turn on said first and second auxiliary switches to direct the current from said DC power supply to said resonant inductor; whereby a resonant circuit is formed by said resonant inductor and said snubber capacitors connected in parallel with said main switches when the current of said resonant inductor goes up approximately to the load current; wherein said control circuit is adapted to output a signal for turning on said first main switch when the voltage across said first main switch goes down approximately to zero through the resonance in said resonance circuit.

2. A power conversion apparatus as defined in claim 1, which further includes:

serial-connected third and fourth auxiliary switches which are connected between the negative side of said DC power supply and said inductor so as to form a second auxiliary resonant circuit;

an auxiliary-switch snubber capacitor connected between the junction between said first and second auxiliary switches and the junction between said third and fourth auxiliary switches; and a diode connected to each of said third and fourth auxiliary switches so as to become reverse biased with respect to said DC power supply; wherein said control circuit is adapted to provide a turn-off signal to said first auxiliary switch when the charged voltage of said auxiliary-switch snubber capacitor is approximately equal to the voltage of said DC power supply after said first main switch is turned on, and to provide the turn-off signal to said second auxiliary switch when the charged voltage of said auxiliary-switch snubber capacitor is approximately equal to zero after said first main switch is turned on, so as to achieve soft-switching of said first and second auxiliary switches.

3. A power conversion apparatus including:

at least a pair of main switches composed of serial-connected first and second main switches, one of the ends of said first main switch being connected with the positive side of a DC power supply, one of the ends of said second main switch being connected to the negative side of said DC power supply;

a diode connected in parallel with each of said main switches so as to become reverse biased with respect to said DC power supply;

a main-switch snubber capacitor connected in parallel with each of said main switches;

a load connected with the junction between said pair of main switches; and a control circuit for forming a switching signal for controlling the switching operation of said main switches by using a load voltage and/or a load current as an input thereof, wherein said main switches are controllably switched according said switching signal from said control circuit so as to generate an output, said power conversion apparatus comprising:

a second auxiliary resonant circuit including serial-connected third and fourth auxiliary switches and a resonant inductor connected in series with said fourth auxiliary switch, said second auxiliary resonant circuit being connected with each of the negative side of said DC power supply and the junction between said pair of main switches;

a diode connected to each of said third and fourth auxiliary switches so as to become reverse biased with respect to said DC power supply; and voltage detecting means for detecting the voltage across each of said main switches and auxiliary switches; wherein said control circuit is applied with a voltage signal as an input representing said voltage across each of said main switches and auxiliary switches from said voltage detecting means, said control circuit being adapted to provide a turn-on signal to said third and fourth auxiliary switches according to said input, before a turn-on signal as the switching signal is provided to said second main switch, when said first main switch is in ON-state to allow the load current to pass through said first main switch and said load current is less than a threshold associated with the product of multiplying the capacity of said main-switch snubber capacitor by the power supply voltage of said DC power supply, so as to turn on said third and fourth auxiliary switches to direct the current from said DC power supply to said resonant inductor; wherein said control circuit is adapted to provide a turn-off signal to said first main switch when the current of said resonant inductor goes up approximately to said threshold, so as to turn off said first main switch.

4. A power conversion apparatus as defined in claim 3, wherein said control circuit is adapted to provide the turn-on signal to said second main switch, when said third and fourth auxiliary switches are in ON-state and the current passing through said resonant inductor is refluxed from said third and fourth auxiliary switches through said diode connected in parallel with said second main switch.

5. A power conversion apparatus as defined in claim 4, wherein said control circuit is adapted to provide the turn-off signal to said third auxiliary switch after said second main switch is turned on, when the initial voltage of said auxiliary-switch snubber capacitor is approximately equal to the voltage of said DC power supply, and to provide the turn-off signal to said fourth auxiliary switch after said second main switch is turned on, when the initial voltage of said auxiliary-switch snubber capacitor is approximately equal to zero.

6. A power conversion apparatus as defined in claim 3, wherein said control circuit is adapted to provide the turn-off signal to said first main switch without providing any turn-on signal to said third and fourth auxiliary switches, when said load current is larger than said threshold.

7. A power conversion apparatus as defined in claim 3, wherein said threshold is defined by the following formula;

$I_{th}=Cr \times V_{in}/t_{max}$ where $I_{th}$ is said threshold, Cr being the capacity of said main-switch snubber capacitor connected in parallel with said main switch, $V_{in}$ being the voltage of said DC power supply, and $t_{max}$ being the maximum allowable value of the time required for the load current to commutate from one of said first and second main switches to the other main switch.

8. A power conversion apparatus including:

at least a pair of main switches composed of serial-connected first and second main switches, one of the ends of said first main switch being connected with the positive side of a DC power supply, one of the ends of said second main switch being connected to the negative side of said DC power supply;

a diode connected in parallel with each of said main switches so as to become reverse biased with respect to said DC power supply;

a main-switch snubber capacitor connected in parallel with each of said main switches;

a load connected with the junction between said pair of main switches; and a control circuit for forming a switching signal for controlling the switching operation of said main switches by using a load voltage and/or a load current as an input thereof, wherein said main switches are controllably switched according said switching signal from said control circuit so as to generate an output, said power conversion apparatus comprising:

a second auxiliary resonant circuit including serial-connected third and fourth auxiliary switches and a resonant inductor connected in series with said fourth auxiliary switch, said second auxiliary resonant circuit being connected with each of the negative side of said DC power supply and the junction between said pair of main switches;

a diode connected to each of said third and fourth auxiliary switches so as to become reverse biased with respect to said DC power supply; and voltage detecting means for detecting the voltage across each of said main switches and auxiliary switches; wherein said control circuit is applied with a voltage signal as an input representing said voltage across each of said main switches and auxiliary switches from said voltage detecting means, said control circuit being adapted to provide a turn-on signal to said third and fourth auxiliary switches and provide a turn-off signal to said first main switch according to said input, before a turn-on signal as the switching signal is provided to said second main switch, when said first main switch is in ON-state to allow the load current to pass through said first main switch and said load current is less than a threshold associated with the product of multiplying the capacity of said main-switch snubber capacitor by the power supply voltage of said DC power supply, so as to turn on said third and fourth auxiliary switches to generate a resonance between said resonant inductor and said snubber capacitors connected in parallel with said main switches.

9. A power conversion apparatus including:

at least a pair of main switches composed of serial-connected first and second main switches, one of the ends of said first main switch being connected with the positive side of a DC power supply, one of the ends of said second main switch being connected to the negative side of said DC power supply;

a diode connected in parallel with each of said main switches so as to become reverse biased with respect to said DC power supply;

a main-switch snubber capacitor connected in parallel with each of said main switches;

a load connected with the junction between said pair of main switches; and a control circuit for forming a switching signal for controlling the switching operation of said main switches by using a load voltage and/or a load current as an input thereof, wherein said main switches are controllably switched according said switching signal from said control circuit so as to generate an output, said power conversion apparatus comprising:

a first auxiliary resonant circuit including serial-connected first and second auxiliary switches and a resonant inductor connected in series with said second auxiliary switch, said first auxiliary resonant circuit being connected with each of the positive side of said DC power supply and the junction between said pair of main switches;

a diode connected to each of said first and second auxiliary switches so as to become reverse biased with respect to said DC power supply;

a second auxiliary resonant circuit formed by connecting serial-connected third and fourth auxiliary switches between the negative side of said DC power supply and said inductor;

an auxiliary-switch snubber capacitor connected between the junction between said first and second auxiliary switches and the junction between said third and fourth auxiliary switches;

a diode connected to each of said third and fourth auxiliary switches so as to become reverse biased with respect to said DC power supply; and voltage detecting means for detecting the voltage across each of said main switches and auxiliary switches; wherein said control circuit is applied with a voltage signal as an input representing said voltage across each of said main switches and auxiliary switches from said voltage detecting means, said control circuit being adapted to provide a turn-on signal to said first and second auxiliary switches according to said input before a turn-on signal as the switching signal is provided to said first main switch, said control circuit being adapted to provide the turn-on signal to said first and second auxiliary switches when the load current passes through said diode connected in parallel with said second main switch, so as to turn on said first and second auxiliary switches to direct the current from said DC power supply to said resonant inductor; wherein said control circuit is adapted to output a signal for turning on said first main switch when the voltage across said first main switch goes down approximately to zero through the resonance in a resonance circuit formed by said resonant inductor and said snubber capacitors connected in parallel with said main switches when the current of said resonant inductor goes up approximately to the load current.

10. A power conversion apparatus as defined in claim 9, wherein said control circuit is adapted to provide a turn-off signal to said first auxiliary switch when the charged voltage of said auxiliary-switch snubber capacitor is approximately equal to the voltage of said DC power supply after said first main switch is turned on, and to provide the turn-off signal to said second auxiliary switch when the charged voltage of said auxiliary-switch snubber capacitor is approximately equal to zero after said first main switch is turned on, so as to achieve soft-switching of said first and second auxiliary switches.

11. A power conversion apparatus as defined in claim 9, wherein said control circuit is adapted to provide a turn-on signal to said third and fourth auxiliary switches, before a turn-on signal as the switching signal is provided to said second main switch, when said first main switch is in ON-state to allow the load current to pass through said first main switch and said load current is less than a threshold associated with the product of multiplying the capacity of said main-switch snubber capacitor by the power supply voltage of said DC power supply, so as to turn on said third and fourth auxiliary switches to direct the current from said DC power supply to said resonant inductor; wherein said control circuit is adapted to provide a turn-off signal to said first main switch when the current of said resonant inductor goes up approximately to said threshold, so as to turn off said first main switch.

12. A power conversion apparatus as defined in claim 11, wherein said control circuit is adapted to provide the turn-on signal to said second main switch, when said third and fourth auxiliary switches are in ON-state and the current passing through said resonant inductor is refluxed from said third and fourth auxiliary switches through said diode connected in parallel with said second main switch.

13. A power conversion apparatus as defined in claim 9, wherein said control circuit is adapted to provide a turn-on signal to said third and fourth auxiliary switches and provide a turn-off signal to said first main switch, before a turn-on signal as the switching signal is provided to said second main switch, when said first main switch is in ON-state to allow the load current to pass through said first main switch and said load current is less than a threshold associated with the product of multiplying the capacity of said main-switch snubber capacitor by the power supply voltage of said DC power supply, so as to turn on said third and fourth auxiliary switches to generate a resonance between said resonant inductor and said snubber capacitor connected in parallel with said first main switch.

14. A power conversion apparatus including:
at least a pair of main switches composed of serial-connected first and second main switches, one of the ends of said first main switch being connected with the positive side of a DC power supply, one of the ends of said second main switch being connected to the negative side of said DC power supply;
a diode connected in parallel with each of said main switches so as to become reverse biased with respect to said DC power supply;
a main-switch snubber capacitor connected in parallel with each of said main switches;
a load connected with the junction between said pair of main switches; and
a control circuit for forming a switching signal for controlling the switching operation of said main switches by using a load voltage and/or a load current as an input thereof, wherein said main switches are controllably switched according said switching signal from said control circuit so as to generate an output, said power conversion apparatus comprising:

a second auxiliary resonant circuit including serial-connected third and fourth auxiliary switches and a resonant inductor connected in series with said fourth auxiliary switch, said second auxiliary resonant circuit being connected with each of the negative side of said DC power supply and the junction between said pair of main switches;
a diode connected to each of said third and fourth auxiliary switches so as to become reverse biased with respect to said DC power supply; and
voltage detecting means for detecting the voltage across each of said main switches and auxiliary switches; wherein
said control circuit is applied with a voltage signal as an input representing said voltage across each of said main switches and auxiliary switches from said voltage detecting means,
said control circuit being adapted to provide a turn-on signal to said third and fourth auxiliary switches according to said input before a turn-on signal as the switching signal is provided to said second main switch,
said control circuit being adapted to provide the turn-on signal to said third and fourth auxiliary switches when the load current passes through said diode connected in parallel with said first main switch, so as to turn on said third and fourth auxiliary switches to direct the current from said DC power supply to said resonant inductor, whereby
a resonant circuit is formed by said resonant inductor and said snubber capacitors connected in parallel with said main switches when the current of said resonant inductor goes up approximately to the load current, wherein
said control circuit is adapted to output a signal for turning on said second main switch when the voltage across said second main switch goes down approximately to zero through the resonance in said resonance circuit.

15. A power conversion apparatus as defined in claim 14, which further includes:
serial-connected first and second auxiliary switches which are connected between the positive side of said DC power supply and said inductor so as to form a first auxiliary resonant circuit;
an auxiliary-switch snubber capacitor connected between the junction between said first and second auxiliary switches and the junction between said third and fourth auxiliary switches; and
a diode connected to each of said first and second auxiliary switches so as to become reverse biased with respect to said DC power supply; wherein
said control circuit is adapted to provide a turn-off signal to said third auxiliary switch when the charged voltage of said auxiliary-switch snubber capacitor is approximately equal to the voltage of said DC power supply after said second main switch is turned on, and to provide the turn-off signal to said fourth auxiliary switch when the charged voltage of said auxiliary-switch snubber capacitor is approximately equal to zero after said second main switch is turned on, so as to achieve soft-switching of said third and fourth auxiliary switches.

16. A power conversion apparatus including:
at least a pair of main switches composed of serial-connected first and second main switches, one of the ends of said first main switch being connected with the positive side of a DC power supply, one of the ends of said second main switch being connected to the negative side of said DC power supply;

a diode connected in parallel with each of said main switches so as to become reverse biased with respect to said DC power supply;

a main-switch snubber capacitor connected in parallel with each of said main switches;

a load connected with the junction between said pair of main switches; and a control circuit for forming a switching signal for controlling the switching operation of said main switches by using a load voltage and/or a load current as an input thereof, wherein said main switches are controllably switched according said switching signal from said control circuit so as to generate an output, said power conversion apparatus comprising:

a first auxiliary resonant circuit including serial-connected first and second auxiliary switches and a resonant inductor connected in series with said second auxiliary switch, said first auxiliary resonant circuit being connected with each of the negative side of said DC power supply and the junction between said pair of main switches;

a diode connected to each of said first and second auxiliary switches so as to become reverse biased with respect to said DC power supply; and voltage detecting means for detecting the voltage across each of said main switches and auxiliary switches; wherein said control circuit is applied with a voltage signal as an input representing said voltage across each of said main switches and auxiliary switches from said voltage detecting means, said control circuit being adapted to provide a turn-on signal to said first and second auxiliary switches according to said input, before a turn-on signal as the switching signal is provided to said first main switch, when said second main switch is in ON-state to allow the load current to pass through said second main switch and said load current is less than a threshold associated with the product of multiplying the capacity of said main-switch snubber capacitor by the power supply voltage of said DC power supply, so as to turn on said first and second auxiliary switches to direct the current from said DC power supply to said resonant inductor; wherein said control circuit is adapted to provide a turn-off signal to said second main switch when the current of said resonant inductor goes up approximately to said threshold, so as to turn off said second main switch.

17. A power conversion apparatus as defined in claim 16, wherein said control circuit is adapted to provide the turn-on signal to said first main switch, when said first and second auxiliary switches are in ON-state and the current passing through said resonant inductor is refluxed from said first and second auxiliary switches through said diode connected in parallel with said first main switch.

18. A power conversion apparatus as defined in claim 17, wherein said control circuit is adapted to provide the turn-off signal to said first auxiliary switch after said first main switch is turned on, when the initial voltage of said auxiliary-switch snubber capacitor is approximately equal to the voltage of said DC power supply, and to provide the turn-off signal to said second auxiliary switch after said first main switch is turned on, when the initial voltage of said auxiliary-switch snubber capacitor is approximately equal to zero.

19. A power conversion apparatus as defined in claim 16, wherein said control circuit is adapted to provide the turn-off signal to said second main switch without providing any turn-on signal to said first and second auxiliary switches, when said load current is larger than said threshold.

20. A power conversion apparatus as defined in claim 16, wherein said threshold is defined by the following formula;

$$I_{th} = Cr \times V_{in}/t_{max}$$

where $I_{th}$ is said threshold, Cr being the capacity of said main-switch snubber capacitor connected in parallel with said main switch, $V_{in}$ being the voltage of said DC power supply, and $t_{max}$ being the maximum allowable value of the time required for the load current to commutate from one of said first and second main switches to the other main switch.

21. A power conversion apparatus including:

at least a pair of main switches composed of serial-connected first and second main switches, one of the ends of said first main switch being connected with the positive side of a DC power supply, one of the ends of said second main switch being connected to the negative side of said DC power supply;

a diode connected in parallel with each of said main switches so as to become reverse biased with respect to said DC power supply;

a main-switch snubber capacitor connected in parallel with each of said main switches;

a load connected with the junction between said pair of main switches; and a control circuit for forming a switching signal for controlling the switching operation of said main switches by using a load voltage and/or a load current as an input thereof, wherein said main switches are controllably switched according said switching signal from said control circuit so as to generate an output, said power conversion apparatus comprising:

a first auxiliary resonant circuit including serial-connected first and second auxiliary switches and a resonant inductor connected in series with said second auxiliary switch, said first auxiliary resonant circuit being connected with each of the negative side of said DC power supply and the junction between said pair of main switches;

a diode connected to each of said first and second auxiliary switches so as to become reverse biased with respect to said DC power supply; and voltage detecting means for detecting the voltage across each of said main switches and auxiliary switches; wherein said control circuit is applied with a voltage signal as an input representing said voltage across each of said main switches and auxiliary switches from said voltage detecting means, said control circuit being adapted to provide a turn-on signal to said first and second auxiliary switches and provide a turn-off signal to said second main switch according to said input, before a turn-on signal as the switching signal is provided to said first main switch, when said second main switch is in ON-state to allow the load current to pass through said second main switch and said load current is less than a threshold associated with the product of multiplying the capacity of said main-switch snubber capacitor by the power supply voltage of said DC power supply, so as to turn on said first and second auxiliary switches to generate a resonance between said resonant inductor and said snubber capacitor connected in parallel with said second main switch.

22. A power conversion apparatus including:

at least a pair of main switches composed of serial-connected first and second main switches, one of the ends of said first main switch being connected with the positive side of a DC power supply, one of the ends of said second main switch being connected to the negative side of said DC power supply;

a diode connected in parallel with each of said main switches so as to become reverse biased with respect to said DC power supply;

a main-switch snubber capacitor connected in parallel with each of said main switches;

a load connected with the junction between said pair of main switches; and a control circuit for forming a -switching signal for controlling the switching operation of said main switches by using a load voltage and/or a load current as an input thereof, wherein said main switches are controllably switched according said switching signal from said control circuit so as to generate an output, said power conversion apparatus comprising:

a first auxiliary resonant circuit including serial-connected first and second auxiliary switches and a resonant inductor connected in series with said second auxiliary switch, said first auxiliary resonant circuit being connected with each of the positive side of said DC power supply and the junction between said pair of main switches;

a diode connected to each of said first and second auxiliary switches so as to become reverse biased with respect to said DC power supply;

a second auxiliary resonant circuit formed by connecting serial-connected third and fourth auxiliary switches between the negative side of said DC power supply and said inductor;

an auxiliary-switch snubber capacitor connected between the junction between said first and second auxiliary switches and the junction between said third and fourth auxiliary switches;

a diode connected to each of said third and fourth auxiliary switches so as to become reverse biased with respect to said DC power supply; and voltage detecting means for detecting the voltage across each of said main switches and auxiliary switches; wherein said control circuit is applied with a voltage signal as an input representing said voltage across each of said main switches and auxiliary switches from said voltage detecting means;

said control circuit being adapted to provide a turn-on signal to said third and fourth auxiliary switches according to said input before a turn-on signal as the switching signal is provided to said second main switch;

said control circuit being adapted to provide the turn-on signal to said third and fourth auxiliary switches when the load current passes through said diode connected in parallel with said first main switch, so as to turn on said third and fourth auxiliary switches to direct the current from said DC power supply to said resonant inductor; wherein said control circuit is adapted to output a signal for turning on said second main switch when the voltage across said second main switch goes down approximately to zero through the resonance in a resonance circuit formed by said resonant inductor and said snubber capacitors connected in parallel with said main switches when the current of said resonant inductor goes up approximately to the load current.

23. A power conversion apparatus as defined in claim 22, wherein said control circuit is adapted to provide a turn-off signal to said third auxiliary switch when the charged voltage of said auxiliary-switch snubber capacitor is approximately equal to the voltage of said DC power supply after said second main switch is turned on, and to provide the turn-off signal to said fourth auxiliary switch when the charged voltage of said auxiliary-switch snubber capacitor is approximately equal to zero after said second main switch is turned on, so as to achieve soft-switching of said third and fourth auxiliary switches.

24. A power conversion apparatus as defined in claim 22, wherein said control circuit is adapted to provide a turn-on signal to said first and second auxiliary switches, before a turn-on signal as the switching signal is provided to said first main switch, when said second main switch is in ON-state to allow the load current to pass through said second main switch and said load current is less than a threshold associated with the product of multiplying the capacity of said main-switch snubber capacitor by the power supply voltage of said DC power supply, so as to turn on said first and second auxiliary switches to direct the current from said DC power supply to said resonant inductor; wherein said control circuit is adapted to provide a turn-off signal to said second main switch when the current of said resonant inductor goes up approximately to said threshold, so as to turn off said second main switch.

25. A power conversion apparatus as defined in claim 24, wherein said control circuit is adapted to provide the turn-on signal to said first main switch, when said first and second auxiliary switches are in ON-state and the current passing through said resonant inductor is refluxed from said first and second auxiliary switches through said diode connected in parallel with said first main switch.

26. A power conversion apparatus as defined in claim 22, wherein said control circuit is adapted to provide a turn-on signal to said first and second auxiliary switches and provide a turn-off signal to said second main switch, before a turn-on signal as the switching signal is provided to said first main switch, when said second main switch is in ON-state to allow the load current to pass through said second main switch and said load current is less than a threshold associated with the product of multiplying the capacity of said main-switch snubber capacitor by the power supply voltage of said DC power supply, so as to turn on said first and second auxiliary switches to generate a resonance between said resonant inductor and said snubber capacitor connected in parallel with said second main switch.

* * * * *